United States Patent
Kominami et al.

(10) Patent No.: US 6,727,661 B2
(45) Date of Patent: Apr. 27, 2004

(54) SELF-BALLASTED FLUORESCENT LAMP

(75) Inventors: Satoshi Kominami, Osaka (JP);
Toshiaki Kurachi, Osaka (JP);
Kenichiro Takahashi, Osaka (JP); Koji
Miyazaki, Osaka (JP)

(73) Assignee: Matsushita Electric Industrial Co.,
Ltd., Osaka (JP)

( * ) Notice: Subject to any disclaimer, the term of this patent is extended or adjusted under 35 U.S.C. 154(b) by 0 days.

(21) Appl. No.: 10/238,150

(22) Filed: Sep. 10, 2002

(65) Prior Publication Data

US 2003/0057871 A1 Mar. 27, 2003

(30) Foreign Application Priority Data

Sep. 10, 2001 (JP) ........................... 2001-273115
Nov. 7, 2001 (JP) ........................... 2001-341686

(51) Int. Cl.$^7$ ............................. H05B 37/02
(52) U.S. Cl. ..................... 315/209 R; 315/209 SC; 315/291; 315/224
(58) Field of Search ............... 315/209 R, 209 SC, 315/224, 225, 200 R, 246, 248, 291, 307, DIG. 4, 272, 273, 207

(56) References Cited

U.S. PATENT DOCUMENTS

| | | | |
|---|---|---|---|
| 4,949,016 A | 8/1990 | De Bijl et al. | 315/208 |
| 4,949,019 A | 8/1990 | Isaka et al. | 315/246 |
| 5,241,242 A * | 8/1993 | Daub | 315/82 |
| 5,422,548 A | 6/1995 | Yamashita et al. | 315/308 |
| 5,485,059 A | 1/1996 | Yamashita et al. | 315/307 |
| 5,663,613 A | 9/1997 | Yamashita et al. | 315/308 |
| 5,705,898 A | 1/1998 | Yamashita et al. | 315/308 |
| 5,744,916 A * | 4/1998 | Kawabata et al. | 315/308 |
| 6,429,603 B1 * | 8/2002 | Tsugita et al. | 315/224 |

2001/0030514 A1 10/2001 Takahashi et al.

FOREIGN PATENT DOCUMENTS

| | | |
|---|---|---|
| JP | 58-106799 | 6/1983 |
| JP | 5-90898 | 12/1993 |
| JP | 7-73985 | 3/1995 |
| JP | 09129383 A | 5/1997 |
| JP | 09245979 A | 9/1997 |
| JP | 10-172776 | 6/1998 |
| JP | 10-302987 | 11/1998 |
| JP | 11111486 A | 4/1999 |
| JP | 2000-277282 | 10/2000 |
| JP | 2001-93690 | 4/2001 |
| JP | 2001-237096 | 8/2001 |
| JP | 2001-244097 | 9/2001 |
| JP | 2002008889 A | 1/2002 |

OTHER PUBLICATIONS

"Patent Pulse Circuit Engineering Dictionary", Ohmsha Co., Ltd., pp. 13–14, May 20, 1980.

* cited by examiner

Primary Examiner—Tuyet T. Vo
(74) Attorney, Agent, or Firm—Harness, Dickey & Pierce, P.L.C.

(57) ABSTRACT

The invention provides a self-ballasted fluorescent lamp provided with a function for operating normally when the self-ballasted fluorescent lamp is inadvertently connected to a lighting fixture provided with a light bulb dimmer if the dimmer is at the maximum level, and with a function for reliably stopping operation of the ballast circuit if the dimmer is in a dimmed state and thereby latch the lamp in an unlit state and protect the ballast circuit. Even if the self-ballasted fluorescent lamp is connected to a power source via a light bulb dimmer, when a current detected by a current detection circuit exceeds a predetermined current value, a stop circuit stops operation of an inverter circuit and latches it in that stopped state in order to maintain the self-ballasted fluorescent lamp in an unlit state.

25 Claims, 14 Drawing Sheets

SELF-BALLASTED FLUORESCENT LAMP

BACKGROUND OF THE INVENTION

The present invention relates to self-ballasted fluorescent lamps.

Fluorescent lamps, which have lower power consumption and a longer life than light bulbs, have become the subject of interest in recent years as energy-efficient light sources for homes and hotels, for example, because they are better for the global environment and more economic, and the ease with which they can be used as a substitute for light bulbs in lighting fixtures employing light bulbs without requiring any changes has lead to their increasingly widespread use.

Moreover, in addition to conventional self-ballasted fluorescent lamps with electrodes, electrodeless self-ballasted fluorescent lamps have recently also started to become widespread. Because they lack electrodes, electrodeless fluorescent lamps have a 5 to 10 times longer lamp life than fluorescent lamps with electrodes, which are the major factor that determines the lamp life in conventional fluorescent lamps with electrodes, and as a result they are expected to become even more widespread in the future.

To produce the most suitable lighting environment to correspond to the TPO, light is dimmed using the light bulb. A light bulb is normally dimmed through the use of a light bulb dimmer that controls the phase of the alternating current commercial power source in order to control the power that is input to the light bulb and change the brightness. However, when a self-ballasted fluorescent lamp is connected to an ordinary light bulb dimmer, there is a significant increase in the current that is input to the self-ballasted fluorescent lamp compared to when it is not connected to a light bulb dimmer, so that when the light bulb dimmer is operated the current may increase twofold or more.

Therefore, when a self-ballasted fluorescent lamp is connected to a light bulb dimmer, the stress on the electric components due to this increase in input current can significantly shorten the life of the ballast circuit.

This makes it difficult to ensure the reliability of a self-ballasted fluorescent lamp when it is inserted into the socket of a lighting fixture provided with a light bulb dimmer and used, and thus there is a need for technology to solve this problem.

A prior art related to this issue is disclosed in JP H09-129383A, which reports a discharge lamp ballast circuit device and a small scale discharge lamp including this circuit device. In its ballast circuit for operating the discharge lamp, the circuit device is provided with a means for detecting that the current input to the ballast circuit is a periodic current pulse that has a larger amplitude than the applied value, and with a means for blocking the supply of power to the ballast circuit based on the signal detected from said detection means.

FIG. 6 shows the circuit device of the discharge lamp disclosed in JP H09-129383A. As shown in FIG. 6, the circuit device disclosed therein is provided with a rectifier circuit D1 to D4, a storage means constituted by a capacitor C2 joined to the rectifier circuit D1 to D4, a DC/AC converter III for converting DC power from the rectifier circuit D1 to D4 into AC power and supplying it to a lamp LA, a means I(R1 to R6, T1, T2, C1) for detecting a periodic current pulse that has a larger amplitude than an applied value W1, and a means II(IIA, S1) joined to the means I, which alters/stops the state of operation of the circuit device.

When a power source is connected between K1 and K2, the voltage from the rectifier circuit, which is constituted by a resistor R7 and a diode bridge made of diodes D1 to D4, is smoothed out by the capacitor C2 and the direct current from the capacitor C2 is converted into alternating current at the DC/AC converter III and supplied to the lamp LA. If this circuit device were carelessly or otherwise connected to a commercial power source via a light bulb dimmer, then a pulse current with a larger amplitude than if it were not connected via the dimmer would flow periodically. As a consequence of this large amplitude pulse current, the amplitude of the voltage pulse generated in the resistor R6 is increased, the transistor T2 becomes conducting in response to the signal from the resistor R6, and as a result the transistor T1 also becomes conducting and the capacitor C1 is charged by the auxiliary power source (not shown), which is connected to the K3, via the resistor R3 and the transistor T1. The charge in the capacitor C1 is discharged through the resistor R4, however, if the current pulse is larger than the given value W1, the amount of charge that is charged from the auxiliary power source via the terminal K3 is larger than the amount of charge that is discharged via the resistor R4, and as a result the voltage is stepped up at both ends of the capacitor C1 and reaches the value for activating the circuit portion IIA of the means II. When this occurs, the circuit portion IIA puts the switching element S1 into an off state, and supply of the voltage is blocked.

However, with the circuit device shown in FIG. 6, even if the fact that the circuit device has been connected to the light bulb dimmer is detected by the means I for detecting periodic current pulses and the switching element S1 subsequently is turned off, there is a risk that the switching element S1 cannot be maintained (latched) in an off state. In other words, even if the switching element S1 is turned off, power is necessary to latch the switching element S1 in an off state, and if the auxiliary power source is provided at a stage after the rectifier circuit D1 to D4, then the voltage of the auxiliary power will gradually decrease because the line for supplying power to the auxiliary power source is blocked after the switching element S1 is turned off, and thus it is conceivable that the switching element S1 will eventually turn back on. The switching element S1 will then be repeatedly turned on and off, which will cause the lamp LA to repeatedly flicker. The auxiliary power source would be able to latch the switching element S1 in an off state if a rectifier circuit D1 to D4 other than the output power portion of the rectifier circuit D1 to D4 were provided, however, such a configuration would increase the size of the circuit device and would also be disadvantageous in terms of cost.

Also, the circuit device disclosed in JP H09-129383A is configured so that the supply of power to the circuit is always blocked when a self-ballasted fluorescent lamp has been inadvertently connected to a lighting fixture provided with a light bulb dimmer. In the case of a home, however, if the fluorescent lamp could continue to be operated at a maximum level of the dimmer, that is, without being dimmed, even if the lamp were used in this way, a new lighting fixture would not have to be purchased, which is preferable not only in terms of convenience but is also economical.

Also, when a self-ballasted fluorescent lamp does not operate because it has been inadvertently connected to a lighting fixture that is provided with a light bulb dimmer, a lamp that makes it clear to the user whether it is not operated because it has burnt out or because it has been connected to a light bulb dimmer is desirable.

SUMMARY OF THE INVENTION

The present invention is for solving these problems, and provides a self-ballasted fluorescent lamp provided with a function for operating normally when the self-ballasted fluorescent lamp is inadvertently connected to a lighting fixture provided with a light bulb dimmer if the dimmer is at the maximum level, and for detecting an increase in input current and reliably stopping operation of the ballast circuit if the dimmer is in a dimmed state, so as to latch the lamp in an unlit state and protect the ballast circuit.

It is a further object of the present invention to provide a self-ballasted fluorescent lamp capable of displaying via a display element, so that when the self-ballasted fluorescent lamp is inadvertently connected to a lighting fixture provided with a light bulb dimmer and does not operate, it can be made clear to the user that the self-ballasted fluorescent lamp is not operated because it has been connected to a commercial power source via a light bulb dimmer.

A first self-ballasted fluorescent lamp according to the present invention is provided with a lamp base for electrically connecting to a power source, a rectifier circuit for converting alternating current that is input from the lamp base into direct current, a smoothing capacitor that is connected to the rectifier circuit, an inverter circuit for converting direct current from the smoothing capacitor into a high frequency, a current detection circuit for detecting current from the rectifier circuit, and a stop circuit for stopping operation of the inverter circuit if the current that is detected by the current detection circuit exceeds a predetermined current value and maintaining the inverter circuit in that stopped state.

It is preferable that the predetermined current value is set to a value higher than a current value detected when the self-ballasted fluorescent lamp is electrically connected to a light bulb dimmer and is operated at substantially the maximum level.

It is further preferable that the inverter circuit includes at least one switching element and a control circuit that generates a signal for making the switching element alternately conducting and non-conducting, wherein the stop circuit includes a thyristor circuit that includes a portion that functions as a thyristor and that is conducting in response to a signal from the current detection circuit and a transistor for making the switching element non-conducting in response to a signal from the thyristor circuit, and when the current detected by the current detection circuit exceeds the predetermined current value, the thyristor circuit is made conducting in response to the signal from the current detection circuit, the transistor is made conducting by the signal from the thyristor circuit, and the switching element is maintained in a non-conducting state so as to maintain a luminous bulb in an unlit state.

In a preferable embodiment, the inverter circuit includes two FETs configuring a complementary circuit, as the at least one switching element, and the transistor shorts gate and drain of the higher voltage side FET to make it non-conducting.

It is preferable that the thyristor circuit includes a thyristor element as the portion that functions as a thyristor.

It is further preferable that the thyristor circuit includes a circuit made of two transistors as the portion that functions as a thyristor.

It is further preferable that the current detection circuit includes a current detection resistor disposed between the rectifier circuit and the smoothing capacitor and a current detection transistor that is connected in parallel with the current detection resistor and that is conducting when a voltage applied to the current detection resistor exceeds a predetermined value, wherein a signal from the current detection transistor serves as the signal from the current detection circuit and makes the thyristor circuit conducting.

It is further preferable that the rectifier circuit has a thermistor having a negative temperature coefficient, and that the thermistor functions as the current detection resistor.

It is also preferable that a display element that displays when the current detected by the current detection circuit has exceeded a predetermined current value is further provided.

A second self-ballasted fluorescent lamp according to the present invention is provided with a lamp base for electrically connecting to a power source, a rectifier circuit for converting alternating current that is input from the lamp base into direct current, a smoothing capacitor that is connected to the rectifier circuit, an inverter circuit for converting direct current from the smoothing capacitor into a high frequency, a voltage waveform detection circuit for detecting an input pulsating voltage waveform at both ends of the smoothing capacitor, comparing the pulsating voltage waveform with a reference voltage waveform, and outputting a control signal, and a stop circuit for stopping operation of the inverter circuit based on the control signal and maintaining the inverter circuit in that stopped state.

It is preferable that the reference voltage waveform is a voltage waveform when the alternating current input from the lamp base is a commercial power source, and that the stop circuit determines whether the alternating current input from the lamp base is alternating current that has been phase controlled by comparing it to the reference voltage waveform and outputs the control signal.

It is further preferable that the voltage waveform detection circuit is configured by a differential circuit that includes at least a first capacitor and a first resistor, and a series circuit of a second capacitor and a diode for detecting that there is a difference between the voltage waveform at both ends of the smoothing capacitor and the reference voltage waveform through a voltage that is applied to both ends of the first resistor.

It is further preferable that the stop circuit includes a thyristor circuit that includes a portion that functions as a thyristor and that receives a signal from at least the second capacitor of the voltage waveform detection circuit and becomes conducting, and a second resistor for holding the thyristor circuit in a conducting state.

It is additionally also preferable that the inverter circuit includes two FETs configuring a complementary circuit as the at least one switching element, and that the stop circuit is capable of shorting gate and drain of the higher voltage side FET to make it non-conducting.

It is preferable that the thyristor circuit includes a thyristor element as the portion that functions as a thyristor.

It is further preferable that the thyristor circuit includes a circuit made of two transistors as the portion that functions as a thyristor.

It is also preferable that a display element for displaying that the stop circuit has operated is further provided.

It is preferable that the size of rated values of components making up the voltage waveform detection circuit are set to predetermined values so that a current that makes the thyristor circuit conducting is supplied when the control signal is larger than a predetermined value.

It is further preferable that a luminous bulb of the self-ballasted fluorescent lamp is a luminous bulb with electrodes.

It is further preferable that a luminous bulb of the self-ballasted fluorescent lamp is an electrodeless luminous bulb.

A fluorescent lamp operating device according to the present invention is provided with a bulb, into which light emitting gas has been filled, and a ballast circuit for operating the bulb, wherein the ballast circuit includes an AC/DC conversion circuit for converting alternating current voltage into direct current voltage, a DC/AC conversion circuit for converting the direct current voltage converted at the AC/DC conversion circuit into alternating current voltage, a load resonance circuit that is electrically connected to the DC/AC conversion circuit, a detection circuit for detecting whether the alternating current voltage applied to the AC/DC conversion circuit is alternating current voltage that has been phase controlled by a dimmer, and which does not output a stop signal if the alternating current voltage is a commercial power source that has not been phase controlled or if the phase of the alternating current voltage is kept at a state of substantially the maximum level, but does output a stop signal in all other cases, and a stop circuit that stops operation of the DC/AC conversion circuit in response to the stop signal from the detection circuit and keeps the DC/AC conversion circuit in that stopped state.

It is preferable that the detection circuit has a means for detecting current and that it outputs the stop signal in accordance therewith.

It is further preferable that the detection circuit has a means for detecting voltage waveform and that it outputs the stop signal in accordance therewith.

It is further preferable that the fluorescent lamp is configured as a self-ballasted fluorescent lamp in which the bulb, the ballast circuit, and a lamp base that is electrically connected to the ballast circuit are formed into a single unit.

It is further preferable that a cavity portion into which an induction coil has been inserted is provided in the bulb, that the induction coil is included in the load resonance circuit, and that a frequency generated by the DC/AC conversion circuit is 40 to 500 kHz.

DETAILED DESCRIPTION OF THE INVENTION

Embodiment 1

Hereinafter, a first embodiment of a first self-ballasted fluorescent lamp according to the present invention is described with reference to the drawings.

Figure 1:
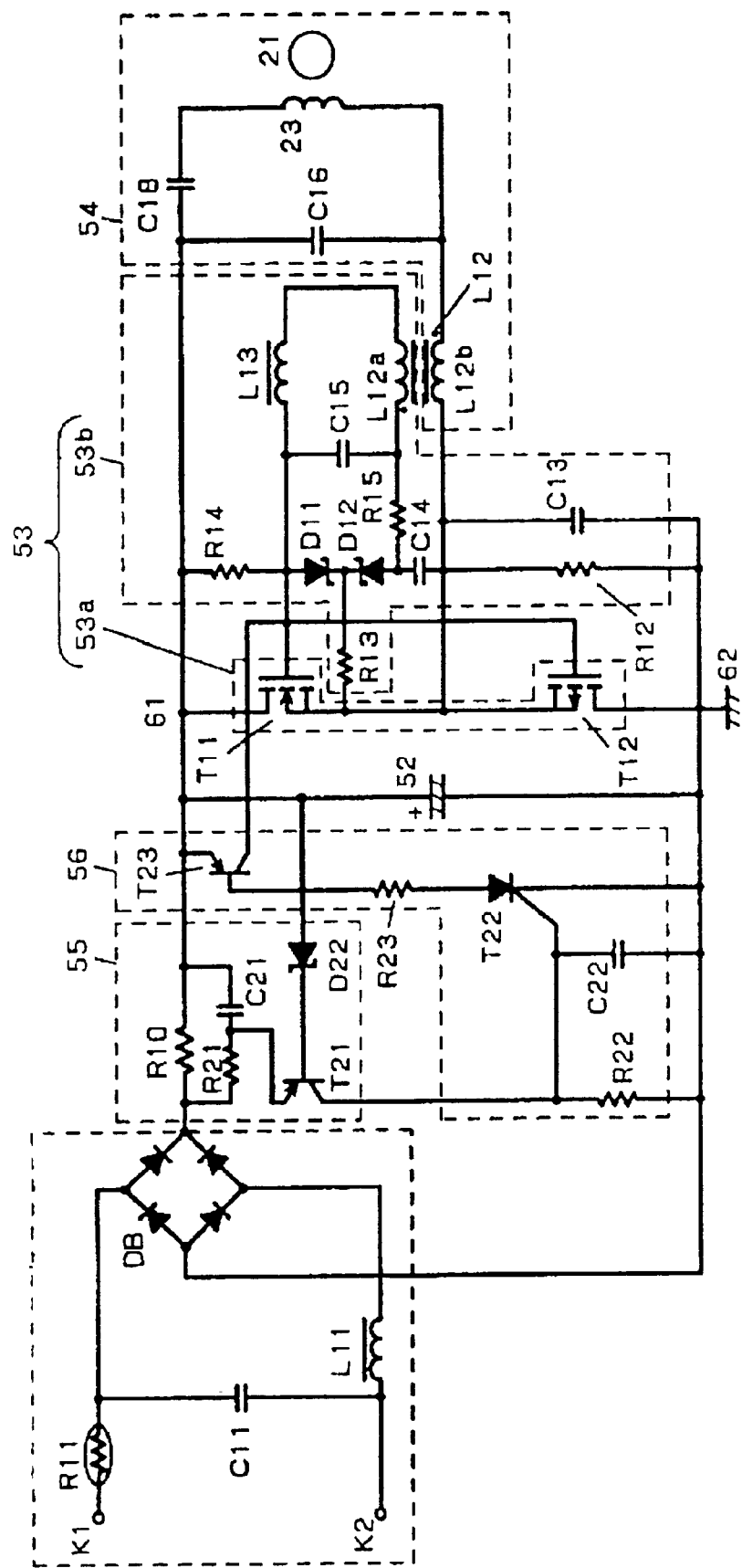
FIG. 1 is a circuit diagram of the self-ballasted fluorescent lamp according to Embodiment 1 of the present invention.

FIG. 1 is a diagram of the ballast circuit of the first self-ballasted fluorescent lamp according to Embodiment 1 of the present invention. The ballast circuit includes a rectifier circuit 51, a smoothing capacitor 52 for smoothing the pulsating current from the rectifier circuit 51, an inverter circuit 53 made of a switching element 53a for converting the smoothed direct current into alternating current and a control circuit 53b for driving and controlling the switching element 53a, a load resonance circuit 54 that includes an electrodeless fluorescent lamp 21, a current detection circuit 55 for detecting the current from the rectifier circuit 51 to the smoothing capacitor 52, and a stop circuit 56 for stopping the operation of the inverter circuit 53 when the current detected with the current detection circuit 55 exceeds a predetermined current value so as to stop the supply of power to the electrodeless fluorescent lamp 21.

Figure 2:
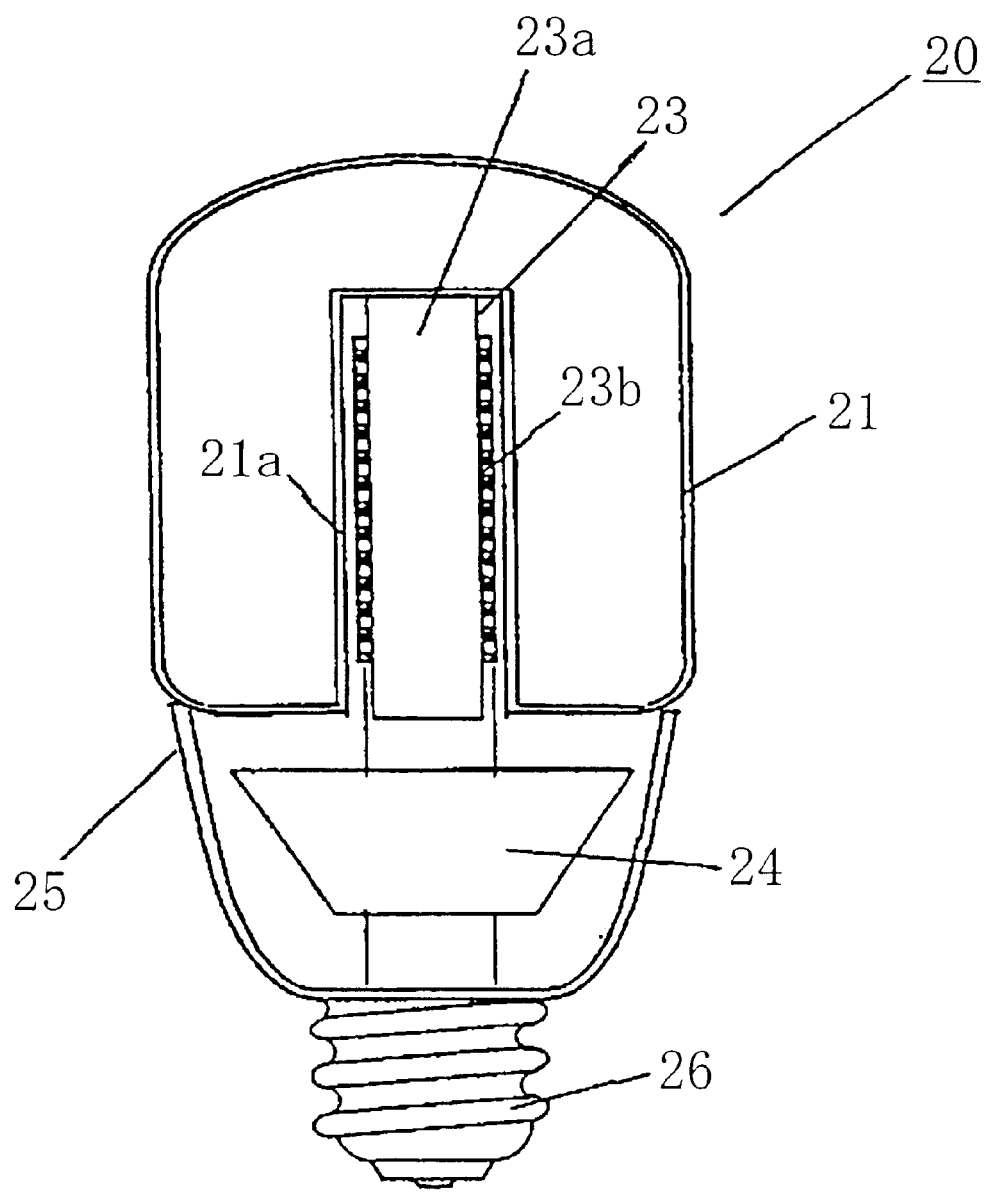
FIG. 2 is a cross-sectional diagram of the self-ballasted fluorescent lamp according to Embodiment 1 of the present invention.

Also, as shown in FIG. 2, the self-ballasted fluorescent lamp according to Embodiment 1 of the present invention has a configuration in which the ballast circuit, the luminous bulb, and the lamp base, for example, are formed into a compact single unit. That is, the self-ballasted fluorescent lamp of this embodiment is provided with a lamp base 26 for electrically connecting to the power source, the rectifier circuit 51 for converting alternating current input from the lamp base 26 into direct current, the smoothing capacitor 52 connected to the rectifier circuit 51, the inverter circuit 53 that converts direct current from the smoothing capacitor 52 into a high frequency, the current detection circuit 55 for detecting the current from the rectifier circuit 51, and the stop circuit 56 for stopping the operation of the inverter circuit 53 and latching the inverter circuit 53 in that stopped state if the current detected by the current detection circuit 55 exceeds the predetermined current value.

In FIG. 2, the electrodeless fluorescent lamp 20 is made of the luminous bulb 21, a housing 25 made of a plastic material such as a resin, and the lamp base 26. The luminous bulb 21 is substantially cylindrical and formed from transparent soda lime glass, for example, and has a cavity portion 21a. Although not shown, the luminous bulb 21 is filled with mercury and a rare gas (such as argon), and phosphor is applied to the inner surface of the luminous bulb 21 to form a phosphor layer (not shown). An induction coil 23 inserted into the cavity portion 21a of the luminous bulb 21 generates an AC electromagnetic field for causing plasma discharge within the luminous bulb 21. The induction coil 23 is constituted by a substantially rod-shaped ferrite core 23a made of a magnetic material and a coil 23b wound around the ferrite core 23a. A circuit board 24 disposed within the housing 25 supplies alternating current to the coil 23b, and the ballast circuit showing in FIG. 1 is formed by the electrical components and the circuit pattern (not shown) and connected to the coil 23b. The power that is input to the circuit board 24 is supplied via the lamp base 26. That is, the lamp base 26 is electrically connected to the ballast circuit. The mercury enclosed in the luminous bulb 21 is excited by the AC electromagnetic field generated by the induction coil 23 and generates ultraviolet light. This UV light is irradiated onto the phosphor applied to the inner surface of the luminous bulb 21 and is converted into visible radiation.

First, the configuration and the operation of the ballast circuit portion, except for the current detection circuit 55 and the stop circuit 56, of the self-ballasted fluorescent lamp of this embodiment is described. It should be noted that the self-ballasted fluorescent lamp is not connected to a light bulb dimmer but rather to a suitable commercial power source, and that current greater than a predetermined current value does not flow through the current detection circuit 55.

In FIG. 1 the rectifier circuit 51 is an ordinary circuit employing a diode bridge DB, and is provided with a thermistor R11 for preventing rush current and with a capacitor C11 and a choke coil L11 serving as filters for preventing noise. The pulsating current that has been subjected to full-wave rectification at the rectifier circuit 51 is smoothed by the smoothing capacitor 52, and DC voltage that substantially matches the peak value of the AC power source voltage is generated at the both ends of the smoothing capacitor 52.

The inverter circuit 53 alternately switches the switching element 53a between conducting and non-conducting states in correspondence with signals from the control circuit 53b in order to convert the direct current from the smoothing capacitor 52 into alternating current. The switching element 53a also includes two field effect transistors (FETs) T11 and T12 constituting a complementary circuit.

The load resonance circuit 54 is made of a primary winding L12b of a transformer L12, a capacitor C18, a capacitor C16, the induction coil 23, and the luminous bulb 21. The mercury filled in the luminous bulb 21 is excited by the electromagnetic field generated by the current flowing through the induction coil 23, and the luminous bulb 21 is illuminated.

The voltage generated at both ends of the smoothing capacitor 52 when the ballast circuit is connected to the AC power source via K1 and K2 connected to the lamp base 26 is applied to the series circuit of a resistor R14, an inductor L13, a secondary winding L12a of the transformer 12, a resistor R15, a capacitor C14, and a resistor R12. When the voltage generated in the capacitor C14 reaches the Zener voltage of a Zener diode D11, the charge of the capacitor C14 is supplied to the gate terminal of T11 of the switching element 53a, and as a result the FET T11 of the switching element 53a is turned on.

When the T11 of the switching element 53a is turned on, the charge stored in the capacitors C18 and C16 is discharged via the T11 of the switching element 53a and the primary winding L12b of the transformer L12. Due to the current flowing through the primary winding L12b of the transformer L12 at this time, voltage is induced in the secondary winding L12a of the transformer L12, and the series resonance circuit configured by the inductor L13 and the capacitor C15 is oscillated at the resonance frequency that is determined by L13 and C15, so that an oscillation voltage is generated at both ends of the capacitor C15. Due to this oscillation voltage, T11 of the switching element 53a is latched in the on state for a predetermined amount of time, after which T11 of the switching element 53a is turned off due to the reverse bias voltage between the gate and the source of T11 of the switching element 53a that is generated at both ends of the capacitor C15. At the same time, a forward bias voltage is applied between the gate and the source of T12 of the switching element 53a, and T12 of the switching element 53a is turned on.

When T12 of the switching element 53a is turned on, the direct current voltage generated at both sides of the capacitor 52 is the power source and current flows through the capacitor C18, the induction coil 23, the primary winding L12b of the transformer L12, and T12 of the switching element 53a. At this time, the direction of the current flowing through the primary winding L12b of the transformer L12 is opposite that when T11 of the switching element 53a is on, and an induction voltage opposite in polarity to the previous induction voltage is generated in the secondary winding L12a of the transformer L12 and oscillates at the resonance frequency established by the inductor L13 and the capacitor C15, so that an oscillation voltage is generated at both ends of the capacitor C15. Due to this oscillation voltage, T12 of the switching element 53a is latched in the on state for a predetermined period of time, after which the reverse bias voltage between the gate and the source of T12 of the switching element 53a is generated at both ends of the capacitor C15, so that T12 of the switching element 53a is turned off. At the same time, a forward bias voltage is applied between the gate and the source of T11 of the switching element 53a, thereby turning on T11 of the switching element 53a.

Subsequently, T11 and T12 of the switching element 53a are repeatedly alternated on and off, thus applying an alternating current to the load resonance circuit 54. The electrodeless fluorescent lamp 21 emits light due to the electromagnetic field that is created by the current flowing through the induction coil 23.

The frequency of the alternating current supplied by a high frequency power source including the inverter circuit 53 is described here. In this embodiment, compared to the ISM band of 13.56 MHz or several MHz that is generally used for practical applications, the frequency of the alternating current supplied by the high frequency power source is in a relatively low frequency region of 1 MHz or less (for example, 40 to 500 kHz). The reason why a frequency in this low frequency region is employed is as follows. First, in the case of operation in a relatively high frequency region of 13.56 MHz or several MHz, the noise filter used to inhibit line noise generated from the high frequency power source becomes large, and this increases the volume of the high frequency power source. Also, when high frequency noise is radiated or propagated from the lamp, an expensive shield must be provided and used in order to meet the very stringent legal regulations placed on high frequency noise, and this becomes an obstacle in reducing costs. On the other hand, in the case of operation in a frequency range about 40 kHz to 1 MHz, the inexpensive, common components that are employed as the electronic components in ordinary electronic devices can be employed as the parts making up the high-frequency power source, and moreover parts with small dimensions can be used. This is extremely advantageous because both cost and size can be reduced. The self-ballasted fluorescent lamp of this embodiment is not limited to operation at 1 MHz or less, and is also capable of operating in a frequency range of 13.56 MHz or several MHz, for example.

The configuration and the operation of the circuit portion, except for the current detection circuit 55 and the stop circuit 56, was described above.

Next, the configuration and the operation of the current detection circuit 55 and the stop circuit 56 of the ballast circuit shown in FIG. 1 is described.

The current detection circuit 55 is configured by a current detection resistor R10, a resistor R21, a capacitor C21, a transistor T21, and a Zener diode D22. Current from the rectifier circuit 51, that is, current that is input to the ballast circuit, is detected by the current detection resistor R10, and a voltage proportional to the current input to the ballast circuit is generated at both ends of the capacitor C21 at the integrated circuit constituted by the resistor R21 and the capacitor C21. When the voltage generated in the capacitor C21 exceeds the Zener voltage of the Zener diode D22, the base current of the transistor T21 is allowed to flow. As a result, current flows from the emitter to the collector of the transistor T21 and serves as the activation current for activating the stop circuit 56. In other words, the current detection circuit 55 includes the circuit detection resistor R10, which is disposed between the rectifier circuit 51 and the smoothing capacitor 52, and the current detection transistor T21, which is connected to the current detection resistor R10 in parallel and which is conducting when the voltage applied to the current detection resistor R10 has at least a predetermined value (the Zener voltage). The thyristor T22 (thyristor circuit) of the stop circuit 56 becomes conducting due to a signal (current) from the transistor T21. It should be noted that the value of the current that is input to the ballast circuit in order to operate the stop circuit 56 can be freely changed depending on the setting of the constant of the Zener diode D22, and the constant of the Zener diode D22 is set so that the Zener diode D22 is not turned on when a light bulb dimmer is not connected and normal current is input, and is turned on when the bulb is inadvertently connected to a light bulb dimmer, thereby increasing the amount of input current.

Even without the resistor R21 and the capacitor C21, the current detection circuit 55 is able to function as above having only the current detection resistor R10, the transistor T21, and the Zener diode D22.

The stop circuit 56 is made of resistors R22 and R23, a capacitor C22, the thyristor T22, and a transistor T23. When a current above a predetermined current value is input to the ballast circuit, the capacitor C22 is charged by the signal from the current detection circuit 55 and a voltage is generated at both ends of the capacitor C22, which is then applied as the gate voltage of the thyristor T22 to make the thyristor T22 conducting. As a result, a base current flows through the transistor T23 to turn it on and short the gate and the drain of T11 of the switching element 53a. When the gate and the drain of T11 of the switching element 53a are shorted, the signal from the control circuit 53b can no longer be delivered normally to T11 of the switching element 53a, and thus T11 of the switching element 53a is turned off and the operation of the inverter circuit 53 is stopped. As a result, the luminous bulb 21 is no longer opearted. Current from the smoothing capacitor 52 flows through the thyristor T22 at this time via the transistor T23 and the resistor R23, and by suitably setting the resistor R23 so that this current is equal to or greater than the holding current of the thyristor T22, the thyristor T22 can be kept on and the inverter 53 maintained in a non-operating state, that is, the luminous bulb 21 is maintained in an unlit state.

Here, the transistor T23 of the stop circuit 56 shorts the gate and the drain of T11, which is the FET on the higher voltage side of the two FETs making up the complementary circuit of the switching element 53a, to make the switching element 53a non-conducting. To stop the operation of the FET and make the switching element non-conducting, ordinarily the gate and the source are shorted, however, in this embodiment the source potential fluctuates between the ground potential and a high potential, so that shorting the gate and the source is difficult. Therefore, the gate and the drain of the FET are shorted to make the switching element 53a non-conducting. Although the reason is unclear, the results of testing show that the circuit may be destroyed when shorting the gate and the drain of T12, which is on the lower potential side of the two FETs, and thus the gate and the drain of T11, which is on the higher potential side, are shorted.

The stop circuit 56 includes a portion that functions as a thyristor, and also includes a thyristor circuit (thyristor T22) that becomes conducting in response to the signal from the current detection circuit 55, and a transistor T23 for putting the switching element 53a into a non-conducting state in response to the signal from the thyristor circuit. When the current detected by the current detection circuit 55 exceeds a predetermined current value, the thyristor circuit conducts the current in response to the signal from the current detection circuit in order to latch the switching circuit in a non-conducting state so as to keep the luminous bulb unlit.

It should be noted that with the self-ballasted fluorescent lamp according to this embodiment, the predetermined current value in the current detection circuit 55 is set to a current value of, for example, 1.2 times the current that flows through the current detection element R10 when the light bulb dimmer is set to the maximum level (100% light output) when the self-ballasted fluorescent lamp is connected to a commercial power source via a light bulb dimmer. That is, the predetermined current value is set higher than the current value that is detected when the lamp is operated at substantially the maximum level of the dimmer (100% light output).

Consequently, if this self-ballasted fluorescent lamp is connected to a commercial power source via a light bulb dimmer, then when the light bulb dimmer is operated to adjust the amount of light (to less than 100% light output), the current detection circuit 55 detects a current above the predetermined current value being input to the ballast circuit, and the stop circuit 56 stops the supply of electrical power to the luminous bulb 21, so that the ballast circuit is prevented from being stressed by the excess current and thereby having its lamp life reduced. Also, the predetermined current value in the current detection circuit 55 is set to 1.2 times the current that is input to the ballast circuit when the light bulb dimmer is at the maximum level (100% light output), so that the fluorescent lamp can be used as is when the dimmer is at the maximum level.

Embodiment 2

Figure 3:
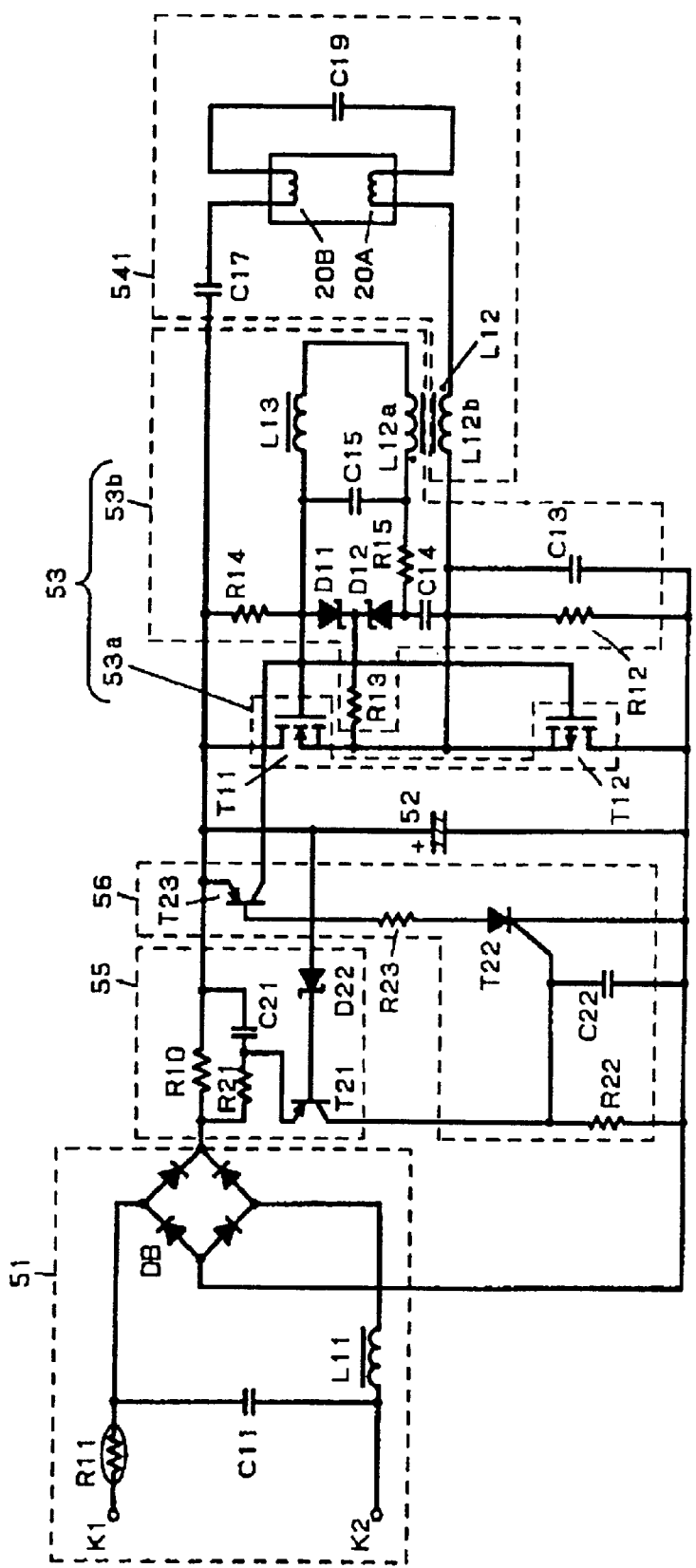
FIG. 3 is a circuit diagram of the self-ballasted fluorescent lamp according to Embodiment 2 of the present invention.

FIG. 3 is a ballast circuit diagram according to Embodiment 2. The only difference to Embodiment 1 is that the lamp has electrodes and thus the structure of the load resonance circuit 541 is different.

As shown in FIG. 3, the load resonance circuit 541 is made of a fluorescent lamp 20 that is provided with electrodes 20A and 20B, a capacitor C17, a capacitor C19 for preheating, and a primary winding L12b of the transformer L12.

In the self-ballasted fluorescent lamp of this embodiment, the predetermined current value that is detected by the current detection circuit 55 is for example 1.2 times the current that is input to the ballast circuit when the self-ballasted fluorescent lamp is connected to a commercial power source via a light bulb dimmer and the light bulb dimmer is set to the maximum level. In this aspect as well, Embodiment 2 is the same as Embodiment 1.

The load resonance circuit 541 forms a series resonance circuit with the capacitor C17, the capacitor C19 for preheating, and the primary winding L12b of the transformer L12, and generates a high voltage at both ends of the capacitor C19 as resonance voltage. When the temperature of the electrodes 20A and 20B rises due to the preheat current thereto and thermoelectrons become easily generated from the electrodes 20A and 20B, then dielectric break-down occurs in the fluorescent lamp 20 and the fluorescent lamp 20 starts to discharge. When the fluorescent lamp 20 starts to discharge, the primary winding L12b of the transformer L12 restricts the current flowing to the fluorescent lamp 20 in order to maintain a stable discharge.

As was described previously in Embodiment 1, when a self-ballasted fluorescent lamp of this configuration is connected to a commercial power source, the current that is input to the ballast circuit is less than the predetermined current value set to the current detection circuit 55 and the stop circuit 56 is not activated, so that the inverter circuit keeps operating and the supply of power to the fluorescent lamp 20 is not stopped.

Conversely, like in Embodiment 1, even if the self-ballasted fluorescent lamp of this embodiment is inadvertently connected to a commercial power source via a light bulb dimmer, the ballast circuit is not strained and its life is not shortened. Also, like in Embodiment 1, the fluorescent lamp can be employed as is as a light source for operating if the dimmer is at the maximum level.

Embodiment 3

Figure 4:
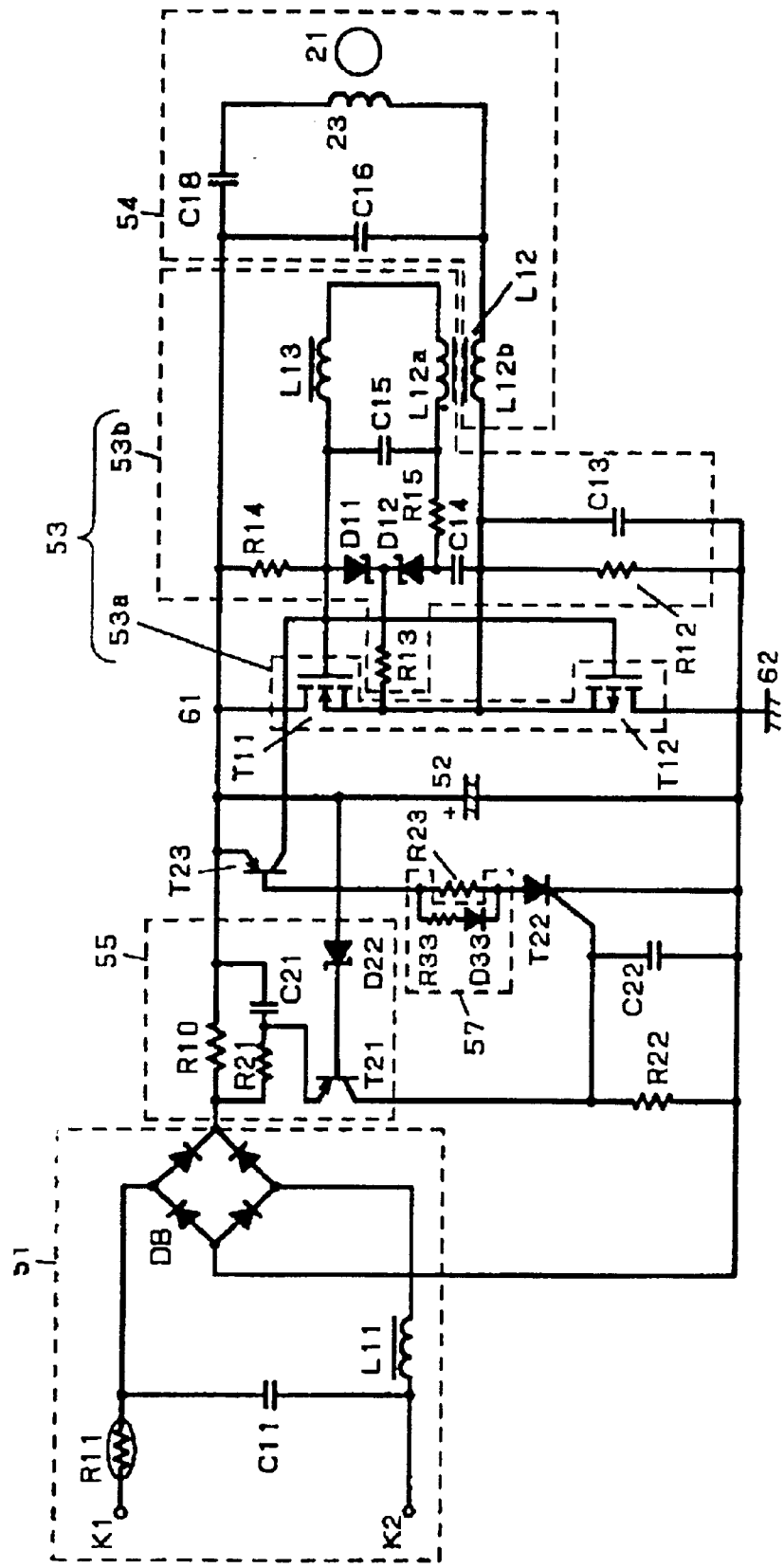
FIG. 4 is a circuit diagram of the self-ballasted fluorescent lamp according to Embodiment 3 of the present invention.

FIG. 4 is a ballast circuit diagram according to Embodiment 3. The present embodiment differs from Embodiment 1 in that a display circuit 57 has been provided to illuminate a display element, such as a light emitting diode, provided on the ballast circuit in order to inform users when the self-ballasted fluorescent lamp is not operated because it has been connected to a light bulb dimmer.

The display circuit 57 is constituted by a light emitting diode D33 and a resistor R33 for preventing excess current to the light emitting diode D33, and is connected to the resistor R23 in parallel.

If the self-ballasted fluorescent lamp provided with the display circuit 57 is connected to a commercial power source via a light bulb dimmer and the current that is input to the ballast circuit exceeds the predetermined current value at the current detection circuit 55, then, as described in Embodiment 1, the stop circuit 56 is operated and the thyristor T22 becomes conducting. At this time, current also flows through the light emitting diode D33, which is connected in parallel to the resistor R33, and the light emitting diode D33 emits light. Due to the light emitting diode D33 emitting light, a user of the self-ballasted fluorescent lamp can recognize that the stop circuit 56 for preventing excess current to the ballast circuit has been operated.

Figure 5:
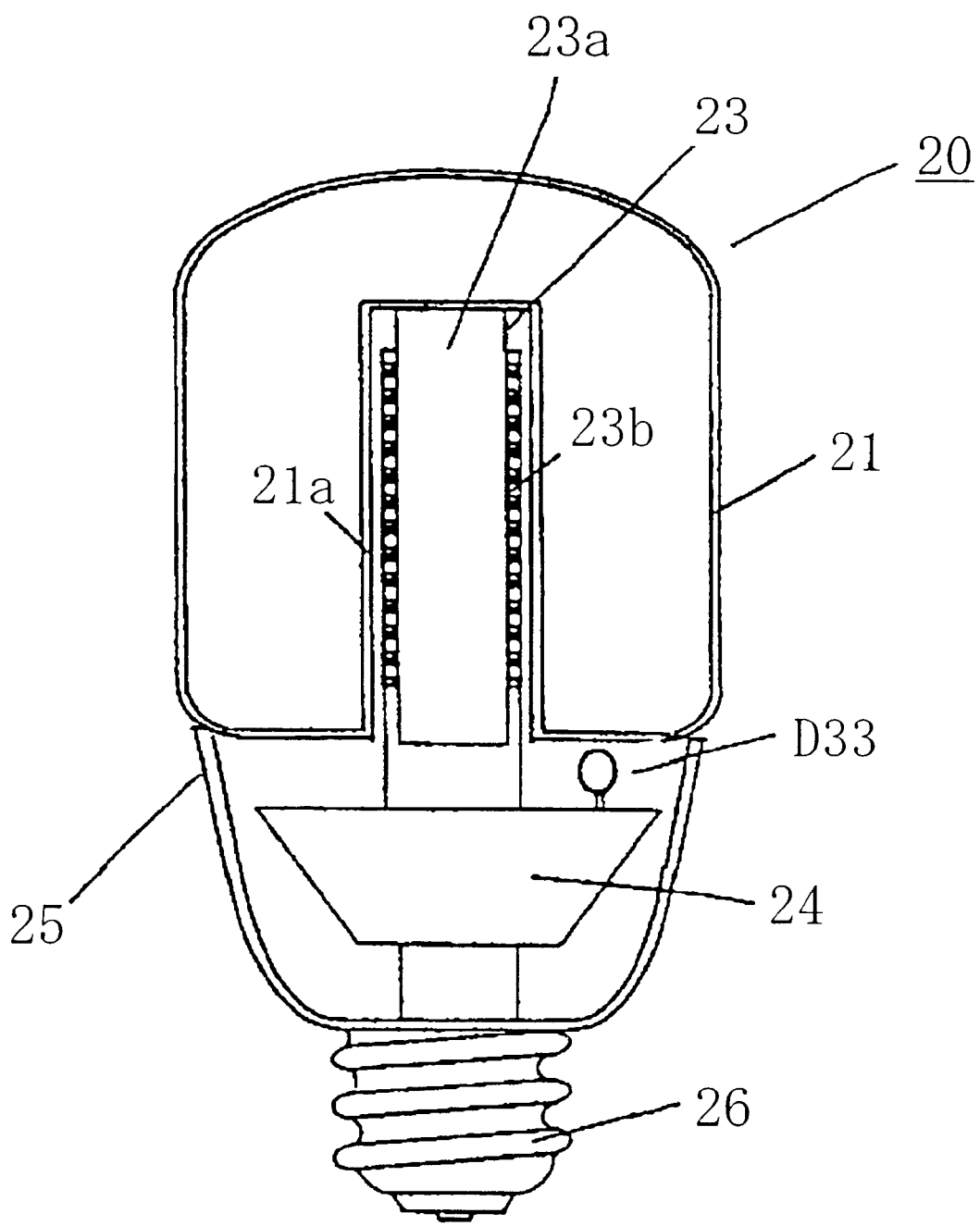
FIG. 5 is a cross-sectional diagram of the self-ballasted fluorescent lamp according to Embodiment 3 of the present invention.
Figure 6:
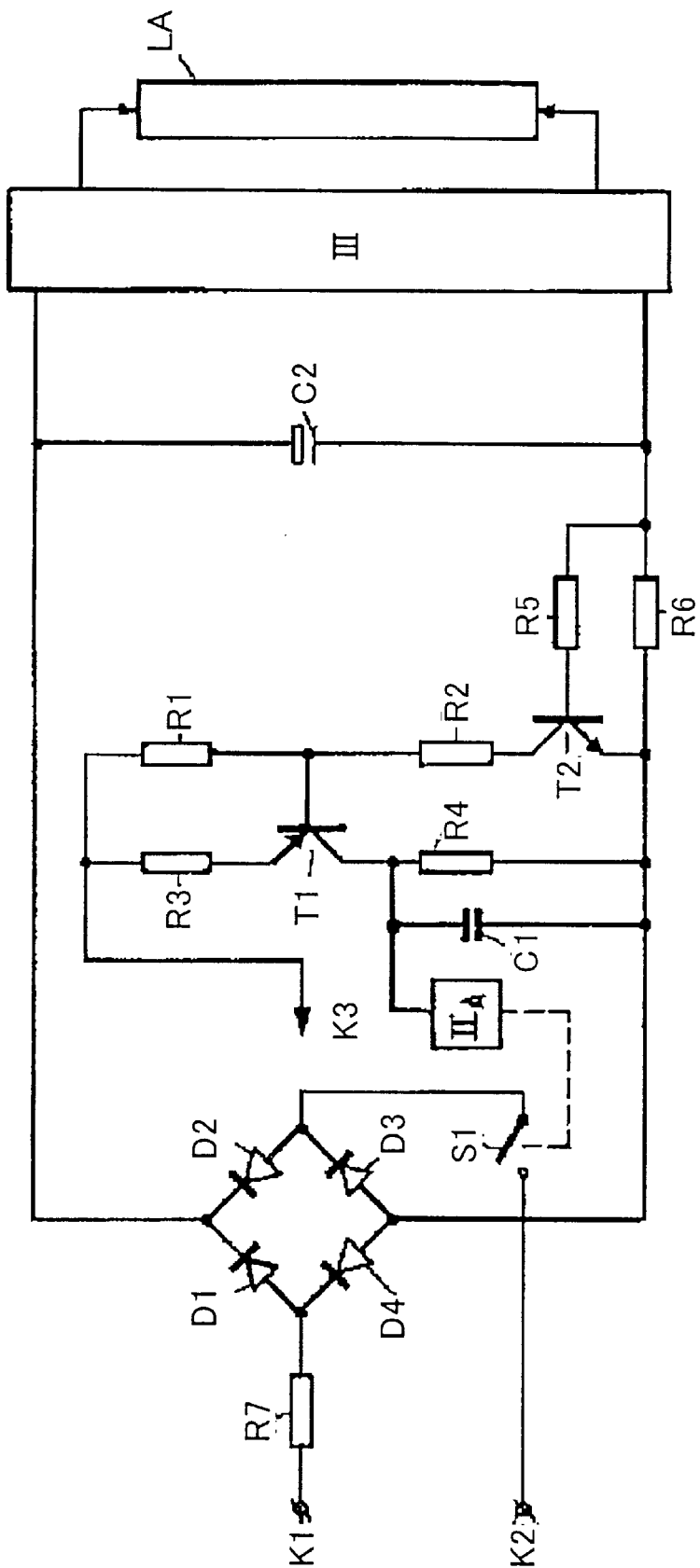
FIG. 6 is a block diagram showing an example of a ballast circuit in the prior art.

A cross-sectional view of the self-ballasted fluorescent lamp described above is shown in FIG. 5. The light emitting diode D33 is disposed on the circuit board 24. When the light emitting diode D33 emits light, a portion of the light from the light emitting diode D33 passes through the electrodeless fluorescent lamp 21 and is visually recognizable to the lamp user. In order to provide an easily recognizable display, it is preferable that a bright, single color LED, such as a GaP (green, yellow), InGaAlP (red), or GaAsP (red) LED, is employed as the light emitting diode D33.

It should be noted that if a current value that is slightly larger, for example 1.2 times larger, than the current value when the light bulb dimmer is at the maximum level (100% light output) is set in the current detection circuit 55 of the self-ballasted fluorescent lamp as the predetermined current value for preventing excess current, then the self-ballasted fluorescent lamp can be used as is at the maximum level of the dimmer. In this case, the light emitting diode D33 is not illuminated.

In Embodiments 1 to 3, the characteristic effect can be anticipated that the number of components can be reduced if the current detection resistor R10 and the thermistor R11 with the negative temperature coefficient that was used by the rectifier circuit 51 are used together. That is, the thermistor R11 can be moved to the position of the current detection resistor R10, and the resistor R10 can be removed.

In Embodiments 1 to 3 the predetermined current value was given as, for example, 1.2 times the current that is input to the ballast circuit when the self-ballasted fluorescent lamp is connected to a commercial power source via a light bulb dimmer and the light bulb dimmer has been set to the maximum level, however, it can also be given at another value, such as 1.3 times.

Figure 14A:
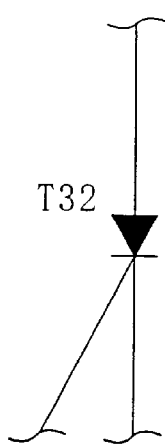
FIGS. 14A, 14B, and 14C are diagrams showing a thyristor, a circuit equivalent to the thyristor, and another circuit equivalent to the thyristor, respectively.
Figure 14B:
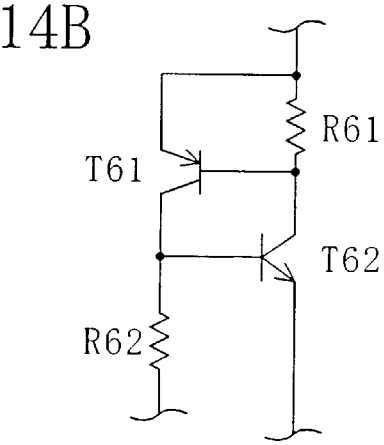
Figure 14C:
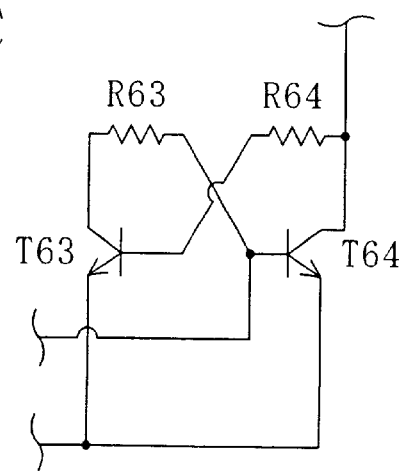

Moreover, as shown in FIG. 14, in Embodiments 1 to 3, the thyristor element T32 can be substituted with an equivalent circuit. FIG. 14B shows a thyristor circuit, configured by two transistors T61 and T62, to serve as a portion that functions as a thyristor, with two resistors R61 and R62 also added as circuit elements. FIG. 14C shows a circuit, configured by two transistors T63 and T64, to serve as a portion that functions as a thyristor, with two resistors R63 and R64 also added as circuit elements.

Embodiment 4

Figure 7:
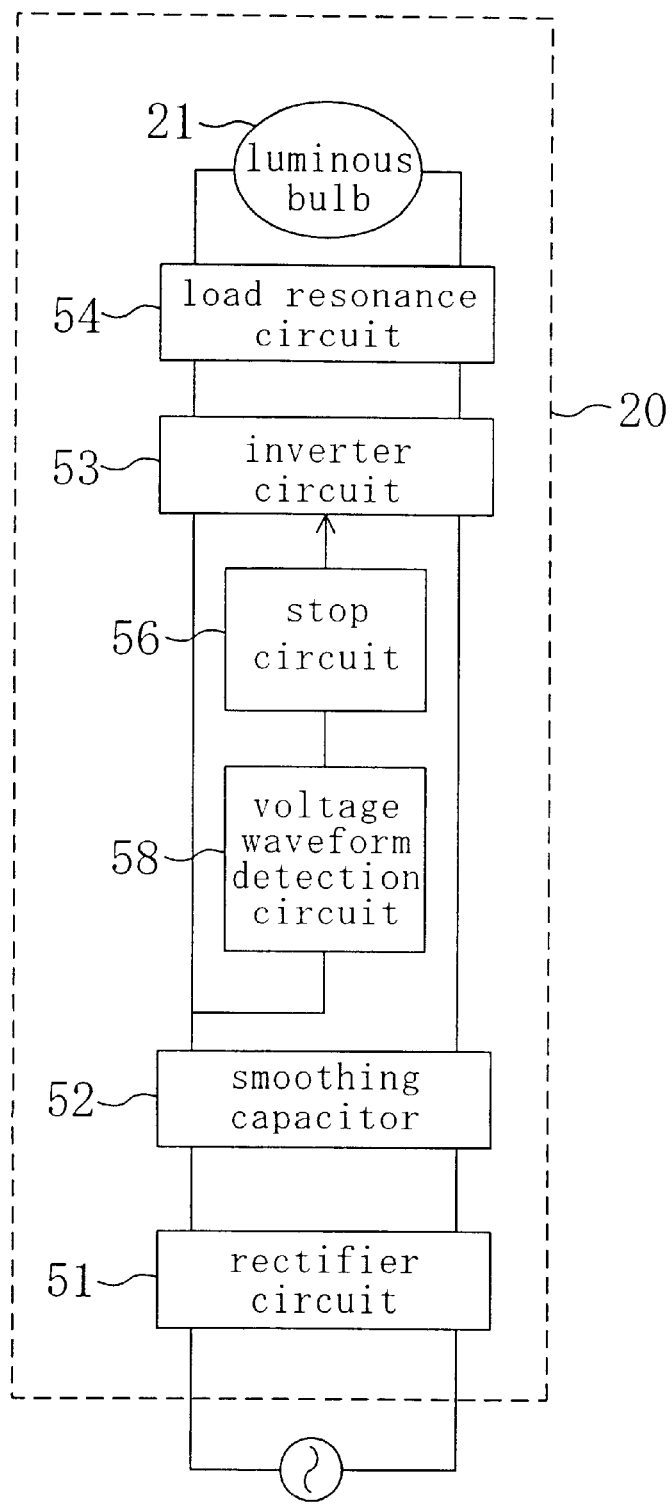
FIG. 7 is a block diagram of the ballast circuit of the self-ballasted fluorescent lamp according to Embodiment 4 of the present invention.

Hereinafter, embodiments of a second self-ballasted fluorescent lamp according to the present invention are described with reference to the drawings. FIG. 7 is a block diagram of the ballast circuit of an electrodeless self-ballasted fluorescent lamp 20 according to Embodiment 4.

The ballast circuit includes a rectifier circuit 51, a smoothing capacitor 52, an inverter circuit 53 for converting the smoothed direct current into alternating current, a load resonance circuit 54 for supplying power to excite discharge gas within a luminous bulb 21, a voltage waveform detection circuit 58 for comparing the voltage waveform at both ends of the smoothing capacitor 52 with the voltage waveform when the lamp is connected to a commercial power source, that is, the reference voltage waveform, and detecting any differences, and for generating a control signal to activate a stop circuit 56 when a difference is detected, and the stop circuit 56 that is activated by the control signal from the voltage waveform detection circuit 58 and stops the operation of the inverter circuit 53.

The electrodeless self-ballasted fluorescent lamp 20 of this embodiment is provided with a lamp base 26 for electrically connecting to the power source, the rectifier circuit 51 for converting the alternating current input from the lamp base 26 into direct current, the smoothing capacitor 52 connected to the rectifier circuit 51, the inverter circuit 53 that converts the direct current from the smoothing capacitor 52 into a high frequency, the voltage waveform detection circuit 58 for detecting the pulsating voltage waveform at both ends of the smoothing capacitor 52 that is input and comparing the pulsating voltage waveform with the reference voltage waveform and outputting a control signal, and the stop circuit 56 for stopping the operation of the inverter circuit 53 and latching it in that stopped state in accordance with the control signal.

Figure 8A:
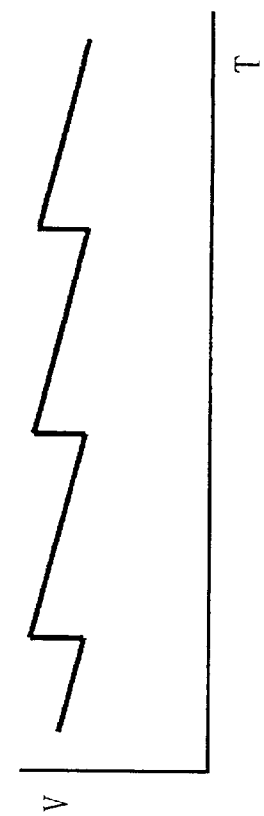
FIGS. 8A, 8B, 8C, and 8D are diagrams respectively showing the voltage waveform at both ends of the smoothing capacitor when the lamp is connected to a commercial power source, the voltage waveform at both ends of the smoothing capacitor when the lamp is connected via a light bulb dimmer, the voltage waveform of 8A passed through the differential circuit, and the voltage waveform of 8B passed through the differential circuit.
Figure 8B:
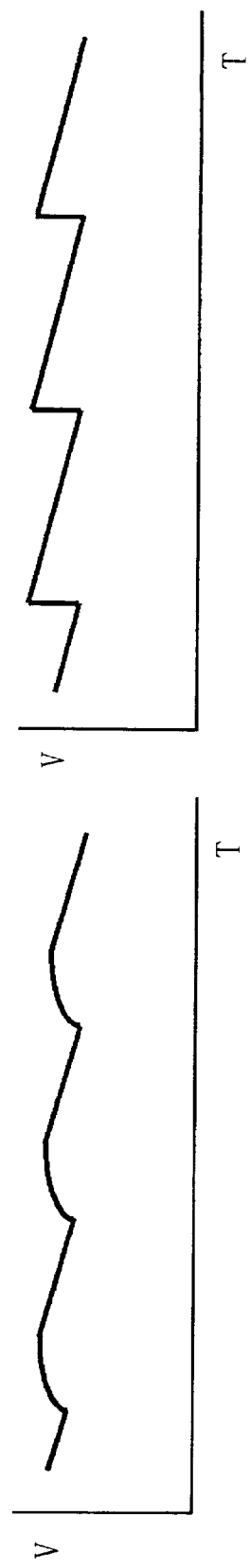

In the electrodeless self-ballasted fluorescent lamp 20 of this configuration, the voltage waveform at both ends of the smoothing capacitor 52 that is detected by the voltage waveform detection circuit 58 is a waveform like that in FIG. 8A when the lamp is connected to a commercial power source and is like the waveform in FIG. 8B when the lamp is connected to a commercial power source via a light bulb dimmer due to phase control. There is a large difference in the voltage waveform between the two cases. The electrodeless self-ballasted fluorescent lamp 20 of this invention exploits this difference in voltage waveform by determining with the voltage waveform detection circuit 58 whether the lamp is connected to a light bulb dimmer, and if the lamp is connected to the power source via a light bulb dimmer, then the stop circuit 56 is activated by the control signal from the voltage waveform detection circuit 58 and stops the operation of the ballast circuit.

Figure 12:
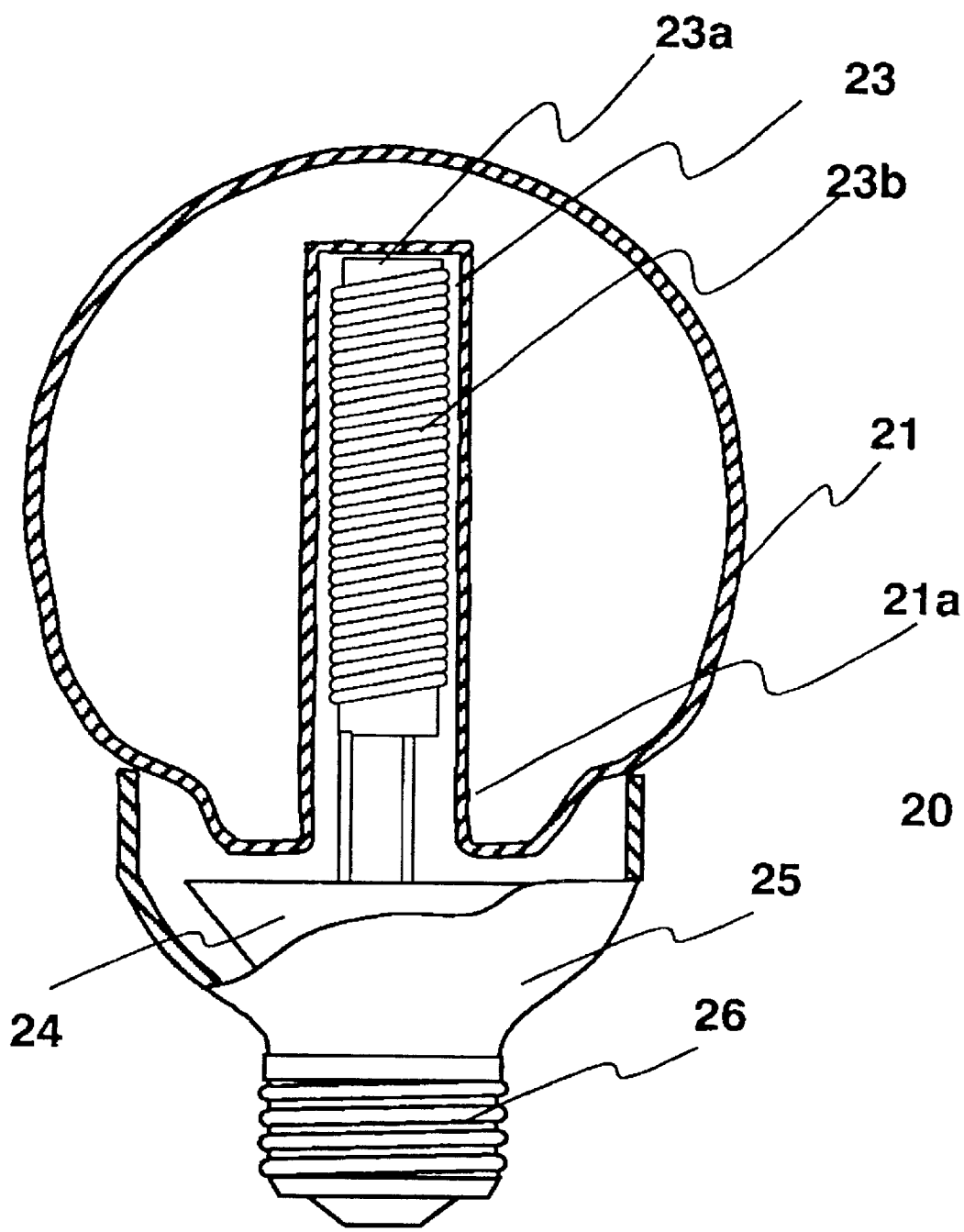
FIG. 12 is a cross-sectional diagram of the self-ballasted fluorescent lamp according to Embodiment 4 of the present invention.

FIG. 12 schematically shows the electrodeless self-ballasted fluorescent lamp 20 of this embodiment. The electrodeless self-ballasted fluorescent lamp 20 has a configuration in which the ballast circuit and the lamp are integrally formed into a compact unit. The electrodeless self-ballasted fluorescent lamp 20 has a cavity portion 21a and is made of a luminous bulb 21 that is transparent and filled with mercury and a rare gas such as argon (not shown). Ultraviolet light generated within the luminous bulb 21 by the excitation action of the mercury is irradiated onto phosphor that has been applied to the inner surface of the luminous bulb 21 and is converted into visible radiation. It should be noted that the luminous bulb 21 is substantially spherical. Plasma discharge for mercury excitation is created by energy supplied by the AC electromagnetic field generated within the luminous bulb 21 by an induction coil 23. The induction coil 23 is constituted by a substantially rod-shaped ferrite core 23a made of a magnetic material and a coil 23b, and is arranged in the cavity portion 21a of the luminous bulb 21. The electrical components making up the ballast circuit for supplying alternating current to the induction coil 23 are disposed on a circuit board 24, and power is supplied to the circuit board 24 via the lamp base 26.

The operation of the electrodeless self-ballasted fluorescent lamp 20 of this embodiment is described next with reference to the ballast circuit block diagram of FIG. 7.

The commercial alternating current that is supplied to the electrodeless self-ballasted fluorescent lamp 20 is first rectified at the rectifier circuit 51 and then removed of any ripple components by the smoothing capacitor 52. The voltage waveform detection circuit 58 compares the voltage waveform at both ends of the smoothing capacitor 52 with the voltage waveform when the electrodeless self-ballasted fluorescent lamp 20 is connected to a commercial power source, that is, the reference voltage waveform, and detects whether they are identical or different. If it is detected that the voltage waveform at both ends of the smoothing capacitor 52 differs from the reference voltage waveform, then a control signal generated at the voltage waveform detection circuit 58 is sent to the stop circuit 56, and the stop circuit 56 stops the operation of the inverter circuit 53. In this case, the electrodeless self-ballasted fluorescent lamp 20 is connected to a light bulb dimmer and phase controlled alternating current is being input thereto. That is, the reference voltage waveform is the voltage waveform when the alternating current that is input from the lamp base 26 is the commercial power source, and the self-ballasted fluorescent lamp 20 has been configured so that a control signal is output by the stop circuit 56 based on a comparison using the reference voltage waveform of whether the alternating current input from the lamp base 26 is phase controlled alternating current.

Figure 8C:
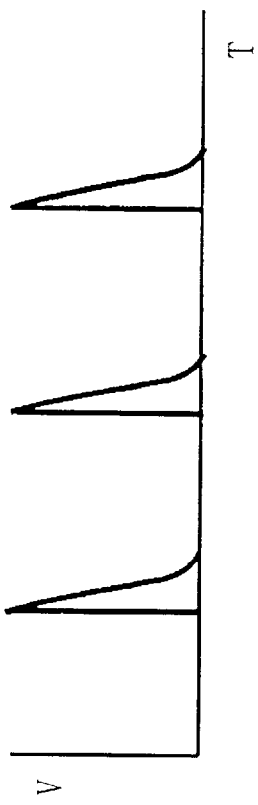
Figure 8D:
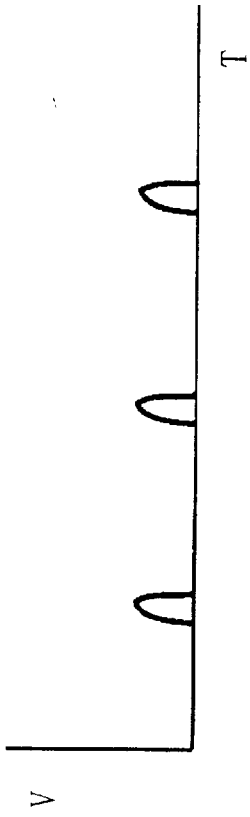

In this embodiment, the following method is employed to compare the voltage waveform at both ends of the smoothing capacitor 52 with the reference voltage waveform and detect any differences therebetween. In this method, the voltage at both ends of the smoothing capacitor 52 is passed through a differential circuit, the amplitude of the obtained voltage pulse is found, and then this amplitude is compared to the amplitude of a voltage pulse of the reference voltage waveform to detect any differences therebetween by whether the waveform is smaller or larger. As shown in FIG. 8B, there is a sharply rising flank in the voltage waveform when the electrodeless bulb-shaped lamp 20 is connected via a light bulb dimmer, which, through Fourier analysis of the voltage waveform, indicates that there is an increase in the high frequency component when the electrodeless self-ballasted fluorescent lamp 20 is connected via a light bulb dimmer. Consequently, with regard to the amplitude of the voltage pulse that is obtained by sending the voltage of the smoothing capacitor 52 through the differential circuit of the voltage waveform detection circuit 58, the amplitude of the voltage pulse when the electrodeless self-ballasted fluorescent lamp 20 is being dimmed by a light bulb dimmer is larger than the amplitude of the voltage pulse when the lamp is connected directly to the commercial power source. This is evident by comparing FIGS. 8C and 8D. The electrodeless self-ballasted fluorescent lamp 20 of this embodiment is configured so that when the amplitude of the voltage pulse that is obtained by passing voltage through the differential circuit of the voltage waveform detection circuit 58 is 5 to 10% or more higher than the amplitude of the voltage pulse when the electrodeless self-ballasted fluorescent lamp 20 is directly connected to the commercial power source without an intervening light bulb dimmer, then the voltage waveform detection circuit 58 detects that the electrodeless self-ballasted fluorescent lamp 20 is connected via a dimmer and transmits a control signal for stopping the inverter circuit 53 to the stop circuit 56.

Consequently, when the electrodeless self-ballasted fluorescent lamp 20 is connected directly to the commercial power source, the control signal for stopping the inverter circuit 53 is not transmitted from the voltage waveform detection circuit 58 to the stop circuit 56. For this reason, the direct current that is sent to the inverter circuit 53 from the rectifier circuit 51 via the smoothing capacitor 52 is converted into alternating current and supplied to the luminous bulb 21 via the load resonance circuit 54 to generate a plasma within the luminous bulb 21 and thereby operate the electrodeless self-ballasted fluorescent lamp 20 normally.

It should be noted that a power MOSFET is employed as the switching element of the inverter circuit 53 in the electrodeless self-ballasted fluorescent lamp 20 of this embodiment. It is of course also possible to employ a device using a power transistor as the switching element.

As described above, according to the present embodiment, even if the electrodeless self-ballasted fluorescent lamp 20 is inadvertently connected to a lighting fixture provided with a light bulb dimmer, the stop circuit 56 is activated to keep the circuit and the lamp from being harmed.

Also, in this embodiment, a method of comparing the amplitude of the voltage pulse that is obtained by passing the voltage at both ends of the smoothing capacitor 52 through a differential circuit to the reference voltage waveform and detecting whether it is larger has been employed as the method for detecting whether the voltage waveform at both ends of the smoothing capacitor 52 is different from the reference voltage waveform, however, the invention is not necessarily limited to this method.

It should be noted that an electrodeless self-ballasted fluorescent lamp was provided as the lamp of this embodiment, however, the same effects as in this aspect of the present invention can be achieved with a self-ballasted fluorescent lamp having electrodes.

Embodiment 5

The electrodeless self-ballasted fluorescent lamp according to Embodiment 5 of the present invention is a specific example using the basic configuration mentioned in the description of Embodiment 4, and emits light under the same principle as that set forth in the description of Embodiment 4 in reference to FIG. 12, and thus further description thereof is omitted. Structural components that are identical to those of Embodiment 4 are assigned identical reference numerals and description thereof is omitted.

Figure 9:
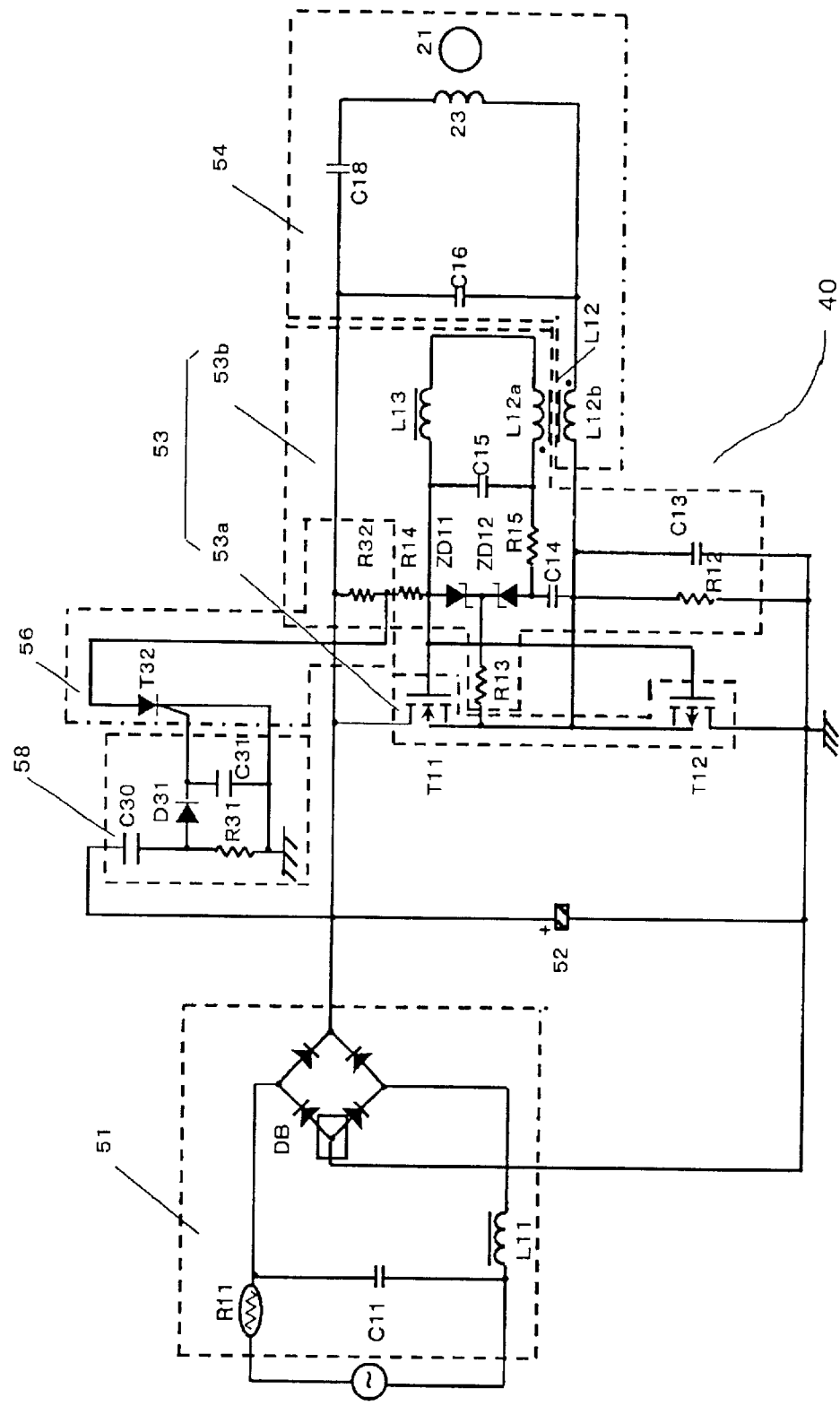
FIG. 9 is a circuit diagram of the self-ballasted fluorescent lamp according to Embodiment 5 of the present invention.

FIG. 9 is a ballast circuit diagram of an electrodeless self-ballasted fluorescent lamp 40 according to this embodiment.

In FIG. 9, the rectifier circuit 51 is an ordinary circuit employing a diode bridge DB, and is provided with a thermistor R11 for preventing in-rush current, and a capacitor C11 and an inductor L11 to serve as filters for preventing noise. The pulsating current that has been subjected to full-wave rectification at the rectifier circuit 51 and smoothed by the smoothing capacitor 52 to generate a direct current voltage at both ends of the capacitor 52 substantially corresponding to the peak value of the alternating current voltage.

The inverter circuit 53 makes the switching element 53a alternately conducting and non-conducting due to a signal from the control circuit 53b in order to convert the direct current from the smoothing capacitor 52 into alternating current. The switching element 53a includes two FETs T11 and T12 constituting a complementary circuit.

The load resonance circuit 54 is made of the primary winding L12b of a transformer L12, the capacitor C18, the capacitor C16, the induction coil 23, and the luminous bulb 21. The mercury filled in the luminous bulb 21 is excited by the electric field generated by the current flowing through the induction coil 23 and is irradiated.

The voltage generated at both ends of the smoothing capacitor 52 when the ballast circuit is connected to the power source via the lamp base 26 is given to the series circuit of a resistor R32, the resistor R14, the inductor L13, the secondary winding L12a of the transformer 12, the resistor R15, the capacitor C14, and the resistor R12. When the voltage generated in the capacitor C14 reaches the Zener voltage of the Zener diode ZD11, the charge of the capacitor C14 is supplied to the gate terminal of T11 of the switching element 53a, and as a result T11 of the switching element 53a is turned on. When T11 of the switching element 53a is turned on, the charge built up in the capacitors C18 and C16 is discharged via T11 of the switching element 53a and the primary winding L12b of the transformer L12. Induction voltage is generated in the secondary winding L12a of the transformer L12 at this time, and the in series resonance circuit of the inductor L13 and the capacitor C15 is oscillated at the resonance frequency that is determined by L13 and the C15, thereby generating an oscillation voltage at both ends of the capacitor C15. Due to this oscillation voltage, the reverse bias voltage that is generated at both ends of the capacitor C15 is given between the gate and the source of T11 of the switching element 53a, so that T11 of the switching element 53a is latched in the off state. At the same time, a forward bias voltage is given between the gate and the source of T12 of the switching element 53a, so that T12 of the switching element 53a is turned on. When T12 of the switching element 53a is turned on, the direct current voltage generated at both ends of the capacitor 52 acts as the power source and current flows through the capacitor C18, the induction coil 23, the primary winding L12b of the transformer L12, and T12 of the switching element 53a. At this time, the direction of the current flowing through the primary winding L12b of the transformer L12 is reverse that when the T11 of the switching element 53a is on, and an induction voltage reverse in polarity to the previous induction voltage is generated in the secondary winding L12a of the transformer L12 and oscillates at the resonance frequency that is determined by the inductor L13 and the capacitor C15, so that an oscillation voltage is generated at both ends of the capacitor C15. Due to this oscillation voltage, T12 of the switching element 53a is latched in the on state for a predetermined period of time, after which the reverse bias voltage that generated at both ends of the capacitor C15 is given between the gate and the source of T12 of the switching element 53a, so that T12 of the switching element 53a is turned off. Simultaneously, a forward bias voltage is given between the gate and the source of T11 of the switching element 53a, thereby turning on T11 of the switching element 53a. Subsequently, T11 and T12 of the switching element 53a are repeatedly alternated between on and off, thereby given an alternating current to the load resonance circuit 54. The luminous bulb 21 emits lights due to the electromagnetic field that is created by the current flowing through the induction coil 23.

The configuration and the operation of the circuit portion, except for the voltage waveform detection circuit 58 and the stop circuit 56, were described above.

Next, the configuration and the operation of the voltage waveform detection circuit 58 and the stop circuit 56 of the ballast circuit shown in FIG. 9 is described.

The voltage waveform detection circuit 58 is made of a capacitor C30, a resistor R31, a diode D31, and a capacitor C31, and the stop circuit 56 is made of a thyristor T32 and a resistor R32. In the voltage waveform detection circuit 58, the capacitor C30 and the resistor R31 form a differential circuit that passes the high frequency component, and the capacitor C31 is charged, via the diode D31, by a portion of the current that flows through this differential circuit. That is, one can say that the voltage waveform detection circuit 58 is made of a differential circuit that includes the first capacitor C30 and the first resistor R31, and a series circuit of a second capacitor C31 and the diode D31 for detecting that there is a difference between the voltage waveform at both ends of the smoothing capacitor 52 and the reference voltage waveform by the voltage that is applied to both ends of the first resistor R31.

When the current that is discharged by the capacitor C31 is greater than the gate current that is required to turn on the thyristor T32 of the stop circuit 56 from an off state, current flows between the anode and the cathode of the thyristor T32 and the thyristor T32 is turned on. It should be noted that a current larger than the gate current required to turn on the thyristor T32 is the current discharged by the capacitor C31 when the self-ballasted fluorescent lamp 40 is connected to the light bulb dimmer. When current flows through the thyristor T32, the gate and the drain of T11 (the FET on the high voltage side of the two FETs making up the complementary circuit) of the switching element 53a are shorted, and T11 is turned off. The resistor R32 included in the stop circuit 56 is for constantly maintaining the thyristor T32 in an on state (or in other words, maintaining the stop circuit 56 in an off state), and its resistance has been set so that the current that flows through the thyristor T32 is greater than the holding current.

Consequently, the stop circuit 56 includes a portion that functions as a thyristor, and also includes a thyristor circuit (thyristor T32) for at least receiving the current (signal) from the second capacitor C31 of the voltage waveform detection circuit 58 and becoming conducting, and a second resistor R32 for holding the thyristor circuit (thyristor T32) in a conducting state. The stop circuit 56 also has the capacity to short the gate and the drain of the high-voltage FET to make it non-conducting.

By adopting the above configuration for the electrodeless self-ballasted fluorescent lamp 40, the stop circuit 56 is activated when the electrodeless self-ballasted fluorescent lamp 40 is inadvertently connected to a light bulb dimmer and keeps the electrodeless self-ballasted fluorescent lamp 40 from being destroyed, and if the electrodeless self-ballasted fluorescent lamp 40 is removed from the light bulb dimmer and used, it can be operated normally.

Moreover, the circuit of the electrodeless self-ballasted fluorescent lamp 40 of this embodiment has a much simpler configuration than that of the self-ballasted fluorescent lamp of Embodiment 1, and thus it is economical in that there are fewer structural components. The following investigation was performed regarding this feature.

In this investigation, the ballast circuit of the electrodeless self-ballasted fluorescent lamp 40 was made identical to the ballast circuit of the electrodeless self-ballasted fluorescent lamp 40 of Embodiment 5, and the number of electrical components that must be added thereto in order to form a protective circuit that includes a stop circuit (in the case of Embodiment 5, this circuit is constituted by the voltage waveform detection circuit 58 and the stop circuit 56) was determined for the circuit configuration of this embodiment and for the circuit configuration of Embodiment 1. As is clear from FIG. 9, in the case of the ballast circuit of the electrodeless self-ballasted fluorescent lamp 40 of this embodiment, the number of electrical components that must be added for the voltage waveform detection circuit 58 and the stop circuit 56 is six. These are C30, R31, D31, C31, T32, and R32. On the other hand, in the case of the ballast circuit of the electrodeless self-ballasted fluorescent lamp of Embodiment 1 that is shown in FIG. 1, the number of electrical components that must be added for the current detection circuit 55 and the stop circuit 56 is ten. These are R10, R21, C21, T21, D22, R22, C22, T22, R23, and T23. That is, it was found that by adopting the circuit configuration of the electrodeless self-ballasted fluorescent lamp 40 of this embodiment it was possible to reduce the number of electrical components by four (40%). Consequently, less space is taken up by electrical components in the electrodeless self-ballasted fluorescent lamp 40 of this embodiment, and as a result it was found that not only is the circuit board within the lamp housing formed more easily than in the case of the electrodeless self-ballasted fluorescent lamp of Embodiment 1 but that this is also advantageous for reducing costs.

It should be noted that with the electrodeless self-ballasted fluorescent lamp 40 of this embodiment, the voltage waveform detection circuit 58 and the stop circuit 56 are activated so that the ballast circuit of this electrodeless self-ballasted fluorescent lamp does not operate (that is, it is not illuminated) when the lamp is connected to a commercial power source via a light bulb dimmer not only when the light bulb dimmer is set to dim but also when it is at the maximum level of the dimmer, that is, 100% light output. However, depending on the selection and the settings of the rated values of the electrical components that are employed in the voltage waveform detection circuit 58, it is possible to achieve an electrodeless self-ballasted fluorescent lamp 40 that can continue to be used as is when the light bulb dimmer is at the maximum level by performing the following action.

That is, the rated values of the capacitor C30, the resistor R31, the diode D31, and the capacitor C31 of the voltage waveform detection circuit 58 are selected so that when the electrodeless self-ballasted fluorescent lamp is connected to a commercial power source via a light bulb dimmer and is at the maximum level of the dimmer (100% light output), then due to the voltage that is applied to both ends of the first resistor R31, which is part of the differential circuit of the voltage waveform detection circuit 58 of the ballast circuit shown in FIG. 9, current does not flow to the capacitor C31 via the diode D31 and thus the thyristor T32 is turned off and the light circuit is operated normally. Moreover, when the dimmer is in a dimmed state, current flows to the capacitor C31 via the diode D31 due to the voltage that is applied to both ends of the first resistor R31 and thus the thyristor T32 is turned on and the stop circuit 56 is activated to stop the inverter circuit 53. In other words, the rated values of the components that make up the voltage waveform detection circuit 58 are set to predetermined values so that a current that makes the thyristor T32 conducting is supplied when the control signal from the voltage waveform detection circuit 58 is larger than a predetermined value (for example, 1.2 times the size of the control signal when the light bulb dimmer is at the maximum level). Here, the control signal is the ratio (Y/X) of the amplitude Y of the pulsating voltage waveform passed through the differential circuit, to the amplitude X of the reference voltage waveform passed through the differential circuit.

Thus, if the electrodeless self-ballasted fluorescent lamp with the ballast circuit configuration of the diagram, in which electrical components with selected rated values are employed, is inadvertently connected to a lighting fixture provided with a light bulb dimmer, and if the dimmer is set to the maximum level, then the bulb can be used normally without making any changes, which is convenient. Moreover, even if the light bulb dimmer is carelessly or inadvertently set to a dimmed state, the stop circuit 56 is activated in order to protect the circuit from being harmed due to the flow of a large current to the ballast circuit, as was explained previously.

Embodiment 6

Figure 10:
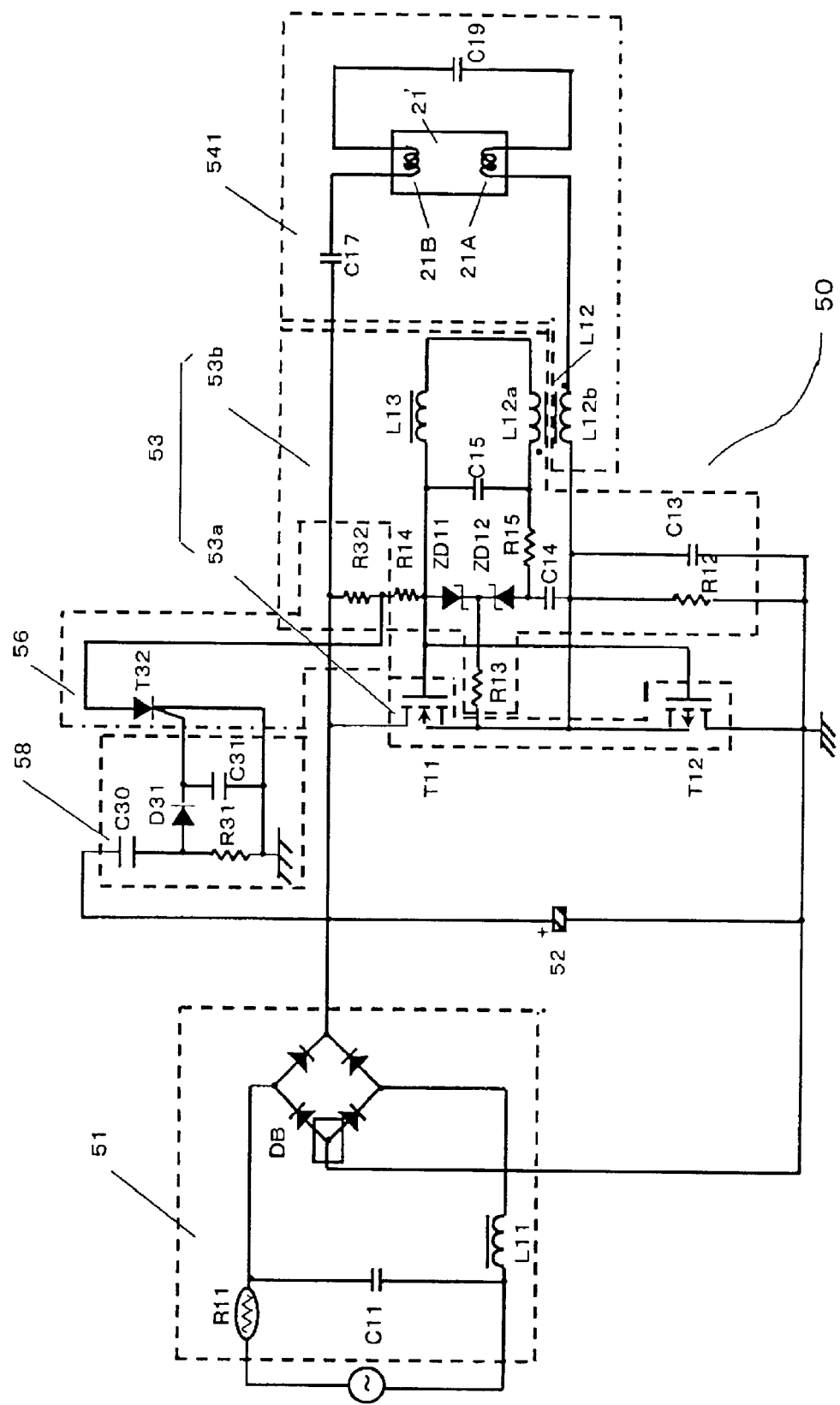
FIG. 10 is a circuit diagram of the self-ballasted fluorescent lamp according to Embodiment 6 of the present invention.

FIG. 10 is a ballast circuit diagram of a self-ballasted fluorescent lamp 50 with electrodes according to Embodiment 6. The only difference to Embodiment 5 is that a luminous bulb 21' has electrodes, and thus the structure of the load resonance circuit 541 is different.

As shown in FIG. 10, the load resonance circuit 541 is made of the luminous bulb 21', which is provided with electrodes 21A and 21B and phosphor has been applied to its inner surface, the capacitor C17, the capacitor C19 for preheating, and the primary winding L12*b* of the transformer L12.

The configuration and the operation of the voltage waveform detection circuit 58 and the stop circuit 56 in the self-ballasted fluorescent lamp 50 with electrodes according to this embodiment are the same as in Embodiment 5.

The load resonance circuit 541 forms a series resonance circuit of the capacitor C17, the capacitor C19 for preheating, and the primary winding of the transformer L12, and generates a high voltage at both ends of the capacitor C19 as resonance voltage. When the temperature of the electrodes 21A and 21B rises due to the preheat current thereto and thermoelectrons are easily generated from the electrodes 21A and 21B, then dielectric break-down occurs in the luminous bulb 21' and the luminous bulb 21' starts to discharge.

When the luminous bulb 21' starts to discharge, the current flowing to the luminous bulb 21' is restricted by the primary winding L12b of the transformer L12 so as to maintain a stable discharge.

As was described earlier in Embodiment 5, when the self-ballasted fluorescent lamp 50 with electrodes of this configuration is connected to a commercial power source, in the voltage waveform detection circuit 58, current does not flow to the diode D31 due to the voltage at both ends of the resistor R31, and thus the thyristor T32 of the stop circuit 56 is not turned on. For this reason, the stop circuit 56 is not activated and the inverter circuit 53 continues operating, so that the supply of power to the luminous bulb 21' is not stopped.

On the other hand, as described in Embodiment 5, even when the self-ballasted fluorescent lamp 50 with electrodes of this embodiment is inadvertently connected to a commercial power source via a light bulb dimmer, in the voltage waveform detection circuit 58, current flows via the diode D31 due to the voltage at both ends of the resistor R31 and the capacitor C31 is charged. When the current discharged from the capacitor C31 flows between the anode and the cathode of the thyristor T32 of the stop circuit 56, the thyristor T32 is turned on, and moreover, this also turns off the switching element T11 so that the inverter circuit 53 stops operating. It should be noted that the value of the resistor R32 of the stop circuit 56 is set so that a current that is larger than the holding current flows through the thyristor T32, and thus the thyristor is maintained in an on state and the operation of the inverter circuit 53 is continuously stopped (that is, it is latched). Consequently, the ballast circuit is not subject to stress and thus its life is not shortened.

It should be noted that, as mentioned with regard to the electrodeless self-ballasted fluorescent lamp of Embodiment 5, by appropriately selecting the rated values of the capacitor C30, the resistor R31, the diode D31, and the capacitor C31 of the voltage waveform detection circuit 58 of FIG. 10, the self-ballasted fluorescent lamp with electrodes with the configuration of this embodiment can also be employed as is when the light bulb dimmer has been set to the maximum level, that is, to 100% light output.

Embodiment 7

A self-ballasted fluorescent lamp 60 of this embodiment has the same basic structure and ballast circuit as the electrodeless self-ballasted fluorescent lamp 20 mentioned earlier in Embodiment 5, except that a display circuit 57 has been provided for irradiating a light emitting diode to inform the user when the stop circuit 56 of the lamp is activated to keep the lamp from operating as a result of the lamp being connected to a light bulb dimmer.

Figure 11:
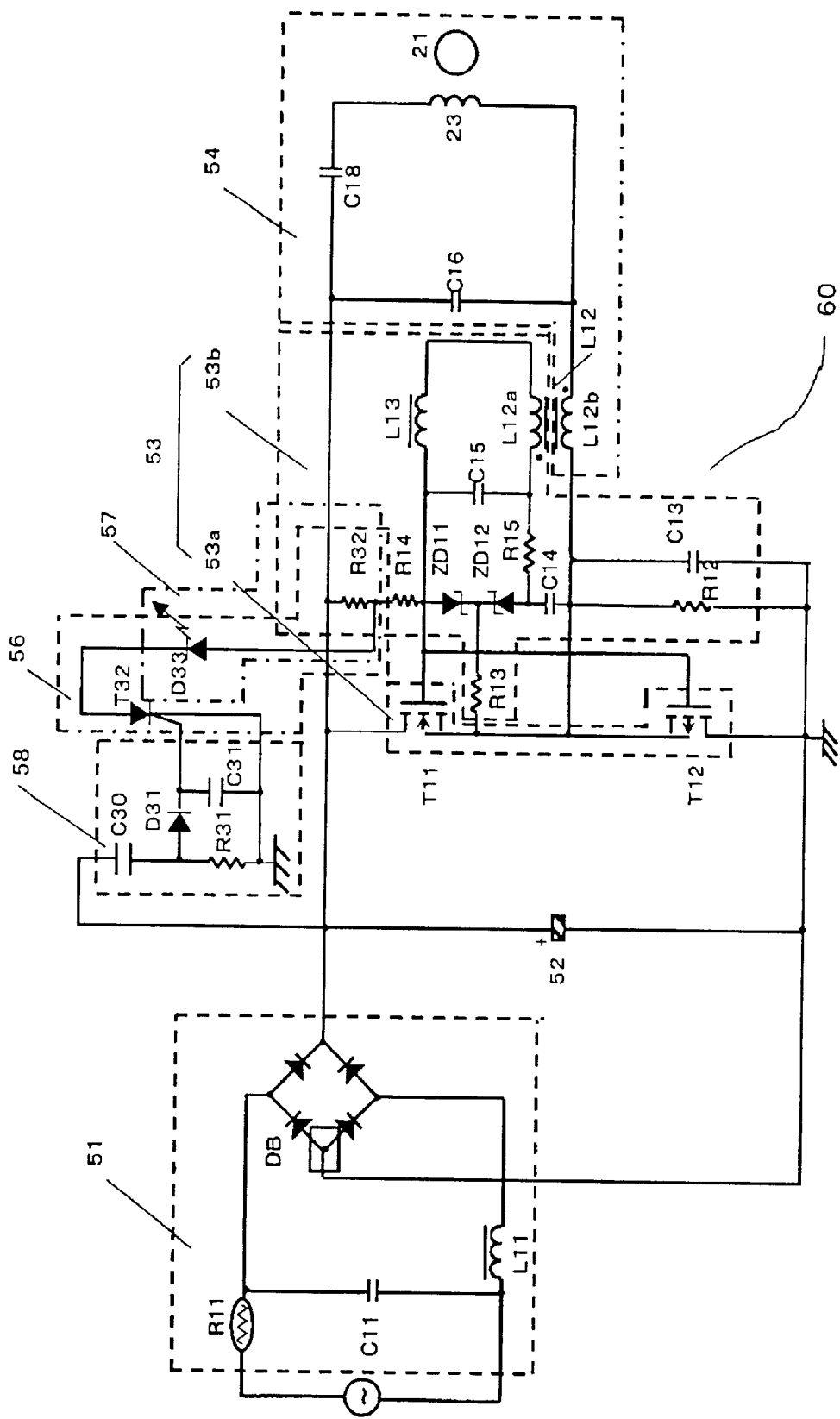
FIG. 11 is a circuit diagram of the self-ballasted fluorescent lamp according to Embodiment 7 of the present invention.

A diagram of the ballast circuit of the electrodeless self-ballasted fluorescent lamp 60 of this embodiment is shown in FIG. 11. As shown in FIG. 11, the display circuit 57 is made up of a light emitting diode D33 and a resistor R32 for preventing excess current to the light emitting diode D33. The resistor R32, as mentioned in Embodiment 5, fulfills the role of ensuring the holding current of the thyristor T32, and inhibits an increase in the number of components because it can be employed as a resistor for preventing excess current.

If the display circuit 57 is provided, then it is clear that the light emitting diode D33 is always illuminated when the thyristor T32 is conducting, and the stop circuit 56 is activated. It will be understood by a user of the electrodeless self-ballasted fluorescent lamp 60 that when the electrodeless self-ballasted fluorescent lamp 60 is not operated but the light emitting diode D33 is irradiating light, that the electrodeless self-ballasted fluorescent lamp 60 is not operated not because there is a problem with the ballast circuit but instead because the electrodeless self-ballasted fluorescent lamp 60 has been connected via a light bulb dimmer and thus the stop circuit 56 has been activated. In this case, if the electrodeless self-ballasted fluorescent lamp 60 is a type that can be used at a non-dimmed state of the maximum level of the dimmer (100% light output), then the lamp can be used as is by setting the dimmer to the maximum level. If the electrodeless self-ballasted fluorescent lamp 60 is a type that cannot be used at the maximum level of the dimmer, then it can be used normally be removing it from the dimmer and connecting it directly to the commercial power source.

Figure 13:
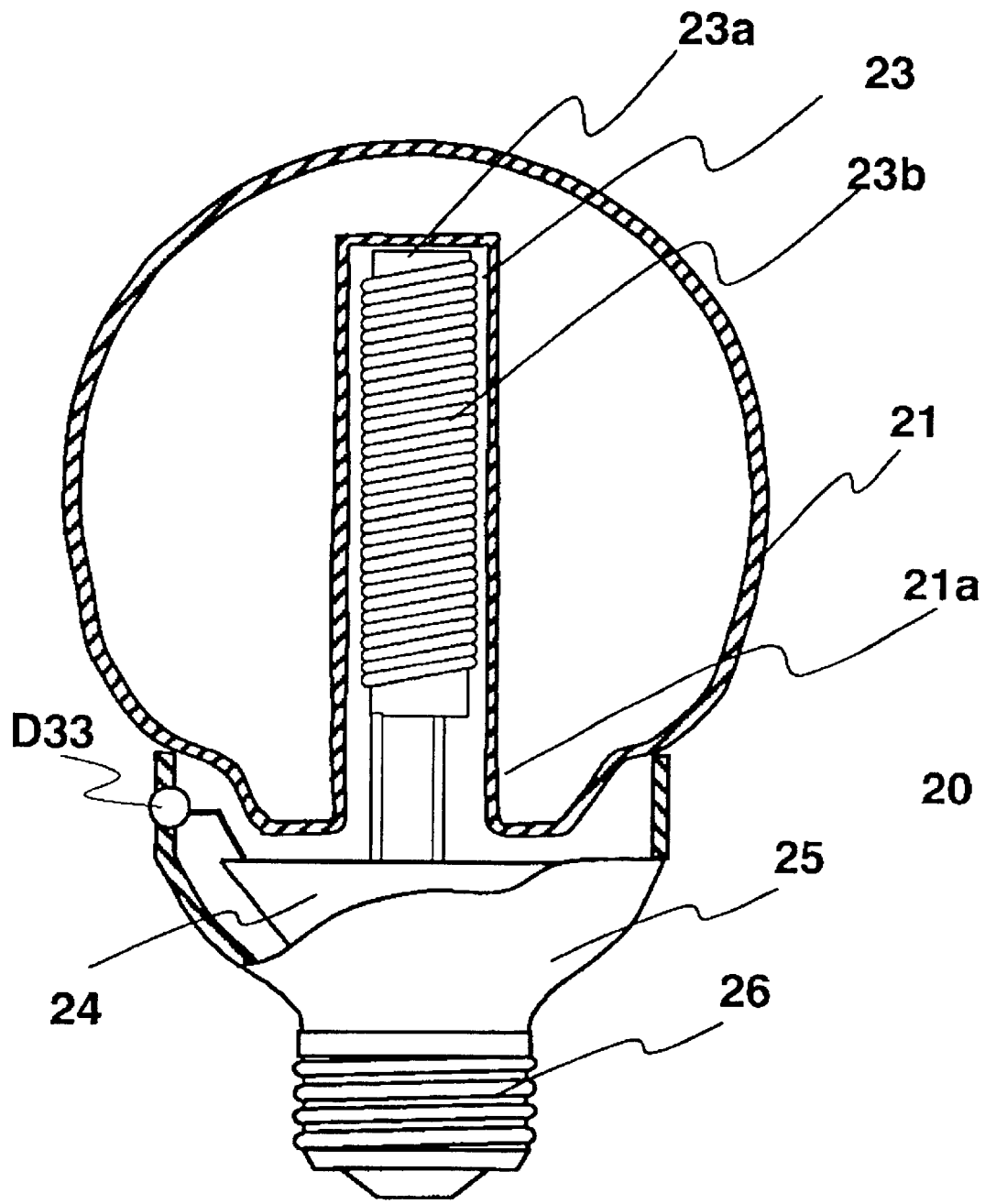
FIG. 13 is a cross-sectional diagram of the self-ballasted fluorescent lamp according to Embodiment 7 of the present invention.

A cross-sectional diagram of the electrodeless self-ballasted fluorescent lamp 60 mentioned above is shown in FIG. 13. The light emitting diode D33 is disposed on the circuit board 24, and it will be easily recognized that the stop circuit 56 has been activated because when the light emitting diode D33 is illuminated, the light passes through the transparent luminous bulb and is radiated to the outside.

In order to provide an easily recognizable display, it is preferable that a bright, single color LED such as a GaP (green, yellow), InGaAlP (red), or GaAsP (red) LED, is employed as the light emitting diode D33.

The location where the light emitting diode D33 of the display circuit 57 is installed does not necessarily have to be that set forth in this embodiment, and may be any location where the emission can be reliably displayed.

It should be noted that the electrodeless self-ballasted fluorescent lamps and the self-ballasted fluorescent lamp with electrodes mentioned in Embodiments 4 to 7 are not limited to lamps for general operation, and can of course also be bulb sunlamps with a lamp base that have a spectrum effective for tanning or creating vitamin D, and bulb plant growing lamps with a lamp base that have a spectrum effective for plant photosynthesis and morphogenesis.

Also, in Embodiments 4 to 7, the thyristor element T32 can be substituted by an equivalent circuit, as shown in FIG. 14. FIG. 14B shows a thyristor circuit, configured by two transistors T61 and T62, that serves as a portion functioning as a thyristor, wherein two resistors R61 and R62 are also added as circuit elements. FIG. 14C shows a circuit, configured by two transistors T63 and T64, that serves as a portion functioning as a thyristor, wherein two resistors R63 and R64 are also added as circuit elements.

The electrodeless bulb-shaped lamp of Embodiment 4 can employ a transparent luminous bulb made of silicate glass or borosilicate glass to which phosphor has not been applied, and the electrodeless self-ballasted fluorescent lamp can be employed as a bulb bactericidal lamp with a lamp base by placing it, for example, within a room in a spot where it is not directly visible.

It can be said that the self-ballasted fluorescent lamps according to Embodiments 1 to 7 are fluorescent lamp operating devices that are provided with a bulb (luminous bulb 21) into which light emitting gas has been filled and a ballast circuit for operating the bulb, wherein the ballast circuit includes an AC/DC conversion circuit (rectifier circuit 51 and smoothing capacitor 52) for converting alternating current voltage into direct current voltage, a DC/AC conversion circuit (inverter circuit 53) for converting the direct current voltage that was converted by the AC/DC conversion circuit into alternating current voltage, a load resonance circuit 54 that is electrically connected to the DC/AC conversion circuit, a detection circuit (current detection circuit 55 or voltage waveform detection circuit 58) for detecting whether the AC voltage applied to the AC/DC conversion circuit is AC voltage that has been phase controlled by a dimmer, and which does not output a stop signal if the AC voltage is a commercial power source that has not been phase controlled or if the phase of the AC voltage is kept at substantially the maximum level of the dimmer, but does output a stop signal in all other cases, and a stop circuit 56 that stops the operation of the DC/AC conversion circuit and latches the DC/AC conversion circuit in that stopped state in response to the stop signal from the detection circuit.

As explained above, with the present invention, it is possible to prevent the ballast circuit from being subject to stress and thereby having a reduced lifespan if the self-ballasted fluorescent lamps are inadvertently connected to a commercial power source via a light bulb dimmer, by detecting that there is an increase in current input to the ballast circuit and stopping circuit operation.

If the self-ballasted fluorescent lamps are inadvertently connected to a commercial power source via a light bulb dimmer, then the increase in current input to the ballast circuit can be detected from the difference in the voltage waveform at both ends of the smoothing capacitor at this time and that when the self-ballasted fluorescent lamps are connected directly to the commercial power source, and based on this detection, the stop circuit is activated in order to stop the operation of the inverter circuit and thereby prevent the ballast circuit from being subject to stress and by extension having its life reduced.

The self-ballasted fluorescent lamps can be used even if they are connected to a commercial power source via a light bulb dimmer, as long as the dimmer is set to the maximum level (100% light output).

Furthermore, with a display element, the user can be notified that the operation of the ballast circuit has been stopped in order to prevent the ballast circuit from being reduced in life due to the increase in the current input thereto, and not because the self-ballasted fluorescent lamp has burnt out.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A self-ballasted fluorescent lamp comprising:
   a lamp base for electrically connecting to a power source;
   a rectifier circuit for converting alternating current that is input from the lamp base into direct current;
   a smoothing capacitor that is connected to the rectifier circuit;
   an inverter circuit for converting direct current from the smoothing capacitor into a high frequency;
   a current detection circuit for detecting current from the rectifier circuit; and
   a stop circuit for stopping operation of the inverter circuit and maintaining the inverter circuit in that stopped state if the current that is detected by the current detection circuit exceeds a predetermined current value;
   wherein the inverter circuit includes:
      at least one switching element; and
      a control circuit that generates a signal for making the switching element alternately conducting and non-conducting;
   wherein the stop circuit includes:
      a thyristor circuit that includes a portion that functions as a thyristor and that is conducting in response to a signal from the current detection circuit; and
      a transistor for making the switching element non-conducting in response to a signal from the thyristor circuit;
      wherein when the current detected by the current detection circuit exceeds the predetermined current value, the thyristor circuit is made conducting in response to the signal from the current detection circuit, the transistor is made conducting by the signal from the thyristor circuit, and the switching element is maintained in a non-conducting state so as to maintain a luminous bulb in an unlit state.

2. The self-ballasted fluorescent lamp according to claim 1, wherein the inverter circuit includes two FETs configuring a complementary circuit as the at least one switching element, and
   wherein the transistor shorts gate and drain of the FET on the higher voltage said to make it non-conducting.

3. The self-ballasted fluorescent lamp according to claim 1, wherein the thyristor circuit includes a thyristor element as the portion that functions as a thyristor.

4. The self-ballasted fluorescent lamp according to claim 1, wherein the thyristor circuit includes a circuit made of two transistors as the portion that functions as a thyristor.

5. The self-ballasted fluorescent lamp according to claim 1, further comprising a display element for displaying when the current detected by the current detection circuit has exceeded a predetermined current value.

6. The self-ballasted fluorescent lamp according to claim 1, wherein a luminous bulb of the self-ballasted fluorescent lamp is a luminous bulb with electrodes.

7. The self-ballasted fluorescent according to claim 1, wherein a luminous bulb of the self-ballasted fluorescent lamp is an electrodeless luminous bulb.

8. The self-ballasted fluorescent lamp according to claim 1, wherein the current detection circuit includes:
   a current detection resistor disposed between the rectifier circuit and the smoothing capacitor; and
   a current detection transistor that is connected in parallel with the current detection resistor and is conducting when a voltage applied to the current detection resistor exceeds a predetermined value;
   wherein a signal from the current detection transistor serves as the signal from the current detection circuit and makes the thyristor circuit conducting.

9. The self-ballasted fluorescent lamp according to claim 8, wherein the rectifier circuit has a thermistor having a negative temperature coefficient, and the thermistor functions as the current detection resistor.

10. A self-ballasted fluorescent lamp comprising:
    a lamp base for electrically connecting to a power source;
    a rectifier circuit for converting alternating current that is input from the lamp base into direct current;
    a smoothing capacitor that is connected to the rectifier circuit;
    an inverter circuit for converting direct current from the smoothing capacitor into a high frequency;
    a voltage waveform detection circuit for detecting an input pulsating voltage waveform at both ends of the smoothing capacitor, comparing the pulsating voltage waveform to a reference voltage wave form, and outputting a control signal; and a stop circuit for stopping operation of the inverter circuit based on the control signal and keeping the inverter circuit in that stopped state.

11. The self-ballasted fluorescent lamp according to claim 10, wherein the reference voltage waveform is a voltage waveform when the alternating current input from the lamp base is a commercial power source, and wherein the stop circuit determines whether the alternating current input from the lamp base is alternating current that has been phase controlled by comparing it to the reference voltage waveform, and outputs the control signal.

12. The self-ballasted fluorescent lamp according to claim 10, wherein the voltage waveform detection circuit comprises:

a differential circuit that includes at least a first capacitor and a first resistor; and a series circuit of a second capacitor and a diode for detecting that there is a difference between the voltage waveform at both ends of the smoothing capacitor and the reference voltage waveform by using a voltage that is applied to both ends of the first resistor.

13. The self-ballasted fluorescent lamp according to claim 10, further comprising a display element for displaying that the stop circuit has operated.

14. The self-ballasted fluorescent lamp according to claim 10, wherein rated values of components making up the voltage waveform detection circuit are set to predetermined values so that a current that makes the thyristor circuit conducting is supplied when the control signal is larger than a predetermined value.

15. The self-ballasted fluorescent lamp according to claim 10, wherein a luminous bulb of the self-ballasted fluorescent lamp is a luminous bulb with electrodes.

16. The self-ballasted fluorescent lamp according to claim 10, wherein a luminous bulb of the self-ballasted fluorescent lamp is an electrodeless luminous bulb.

17. The self-ballasted fluorescent lamp according to claim 10, wherein the stop circuit includes:

a thyristor circuit that includes a portion that functions as a thyristor and that receives a signal from at least the second capacitor of the voltage waveform detection circuit and becomes conducting; and a second resistor for holding the thyristor circuit in a conducting state.

18. The self-ballasted fluorescent lamp according to claim 17, wherein the inverter circuit includes two FETs configuring a complementary circuit as the at least one switching element, and wherein the stop circuit is capable of shorting gate and drain of the FET on the higher voltage side to make it non-conducting.

19. The self-ballasted fluorescent lamp according to claim 17, wherein the thyristor circuit includes a thyristor element as the portion that functions as a thyristor.

20. The self-ballasted fluorescent lamp according to claim 17, wherein the thyristor circuit includes a circuit made of two transistors as the portion that functions as a thyristor.

21. A fluorescent lamp operating device comprising:

a bulb into which light emitting gas has been filled; and a ballast circuit for operating the bulb;

wherein the ballast circuit includes:

an AC/DC conversion circuit for converting alternating current voltage into direct current voltage;

a DC/AC conversion circuit for converting the direct current voltage converted at the AC/DC conversion circuit into alternating current voltage;

a load resonance circuit that is electrically connected to the DC/AC conversion circuit;

a detection circuit for detecting whether the alternating current voltage applied to the AC/DC conversion circuit is alternating current voltage that has been phase controlled, and which does not output a stop signal if the alternating current voltage is a commercial power source that has not been phase controlled or if the phase of the alternating current voltage is kept above a predetermined phase level, but does output a stop signal in all other cases; and a stop circuit that stops operation of the DC/AC conversion circuit in response to the stop signal from the detection circuit and keeps the DC/AC conversion circuit in that stopped state.

22. The fluorescent lamp operating device according to claim 21, wherein the detection circuit has a means for detecting current, and outputs the stop signal in accordance therewith.

23. The fluorescent lamp operating device according to claim 21, wherein the detection circuit has a means for detecting voltage waveform and outputs the stop signal in accordance therewith.

24. The fluorescent lamp operating device according to claim 21, wherein the fluorescent lamp is configured as a self-ballasted fluorescent lamp in which the bulb, the ballast circuit, and a lamp base that is electrically connected to the ballast circuit are formed into a single unit.

25. The electrodeless self-ballasted fluorescent lamp according to claim 21, wherein a cavity portion into which an induction coil has been inserted is provided in the bulb;

the induction coil is included in the load resonance circuit; and a frequency generated by the DC/AC conversion circuit is 40 to 500 kHz.

* * * * *

UNITED STATES PATENT AND TRADEMARK OFFICE
CERTIFICATE OF CORRECTION

PATENT NO. : 6,727,661 B2
DATED : April 27, 2004
INVENTOR(S) : Satoshi Kominami et al.

It is certified that error appears in the above-identified patent and that said Letters Patent is hereby corrected as shown below:

Column 22,
Line 22, "said" should be -- side --
Line 36, after "fluorescent" insert -- lamp --

Signed and Sealed this

Twelfth Day of October, 2004

JON W. DUDAS
*Director of the United States Patent and Trademark Office*